US008723351B2

(12) United States Patent
Stewart et al.

(10) Patent No.: US 8,723,351 B2
(45) Date of Patent: May 13, 2014

(54) MULTI-MODE WAVE ENERGY CONVERTER DEVICES AND SYSTEMS

(75) Inventors: David B. Stewart, Cranbury, NJ (US); James E. Eder, Doylestown, PA (US)

(73) Assignee: Ocean Power Technologies, Inc, Pennington, NJ (US)

(*) Notice: Subject to any disclaimer, the term of this patent is extended or adjusted under 35 U.S.C. 154(b) by 269 days.

(21) Appl. No.: 13/430,052

(22) Filed: Mar. 26, 2012

(65) Prior Publication Data

US 2012/0248775 A1  Oct. 4, 2012

Related U.S. Application Data

(60) Provisional application No. 61/516,004, filed on Mar. 28, 2011, provisional application No. 61/516,003, filed on Mar. 28, 2011, provisional application No. 61/516,025, filed on Mar. 28, 2011.

(51) Int. Cl.
*F03B 13/16*  (2006.01)

(52) U.S. Cl.
CPC ..................... *F03B 13/16* (2013.01)
USPC ........................................... 290/53

(58) Field of Classification Search
CPC .................... F03B 13/16; Y02E 10/38
See application file for complete search history.

(56) References Cited

U.S. PATENT DOCUMENTS

| 4,434,375 | A  | * | 2/1984  | Taylor ............................. 290/53 |
| 7,443,046 | B2 | * | 10/2008 | Stewart et al. .................. 290/53 |
| 8,269,365 | B2 | * | 9/2012  | Clement et al. ................. 290/53 |
| 8,487,459 | B2 | * | 7/2013  | Eder et al. ....................... 290/42 |
| 8,587,139 | B2 | * | 11/2013 | Gerber ............................. 290/42 |
| 2012/0153624 | A1 | * | 6/2012 | Sampaio ........................ 290/53 |
| 2012/0248774 | A1 | * | 10/2012 | Stewart ......................... 290/53 |

* cited by examiner

*Primary Examiner* — Tho D Ta
(74) *Attorney, Agent, or Firm* — Henry I. Schanzer, Esq.

(57) ABSTRACT

A wave energy converter (WEC) system includes WEC devices which can function to produce useful energy (power) efficiently in response to heave motion and/or pitch motion and/or roll motion. Pitch responsive devices are deployed around the outer periphery of a container and one (or more) heave responsive device is located about the center of the container. The pitch responsive devices may be of the type defined as PDWECs which include two reaction masses which are primarily operable in response to pitching motion or they may be of the type which includes one reaction mass operable in response to pitch and/or heave motion.

26 Claims, 25 Drawing Sheets

MULTI-MODE WAVE ENERGY CONVERTER DEVICES AND SYSTEMS

This invention claims priority based on the following provisional applications whose teachings are incorporated herein by reference: (a) provisional application Ser. No. 61/516,004 filed Mar. 28, 2011 and titled PITCH DRIVEN WAVE ENERGY CONVERTER (PDWEC); (b) provisional application Ser. No. 61/516,003 filed Mar. 28, 2011 and titled MULTI-MODE WAVE ENERGY CONVERTER SYSTEM; and (c) provisional application Ser. No. 61/516,025 filed Mar. 28, 2011 and titled HYDRAULIC SPRING.

BACKGROUND OF THE INVENTION

This invention relates to wave energy converter (WEC) devices and WEC buoys (systems) which are configured to produce power efficiently in response to waves whose periods (or wavelengths) may vary substantially as a function of time.

Certain WEC devices are designed to be most efficient in response to high-amplitude, long-period waves. These WEC devices are designed to be primarily responsive to up-down (heave) motion of the waves. The "heave" driven WEC devices tend to be inefficient in response to short period waves causing pitching.

Other WEC devices are designed to be more efficient in response to short period waves which tend to cause pitching (or rolling) of the WEC devices. But these "pitch driven" WEC devices tend to be inefficient in response to long period waves which cause the WEC buoy to primarily move up and down (heave).

Using a primarily (or only) heave responsive WEC device when the periods of the waves may be characterized as "short" is inefficient and not satisfactory. Likewise, using a primarily (or only) pitch responsive WEC device when the periods of the waves may be characterized as "long" is also inefficient and not satisfactory.

It is therefore desirable to have a WEC system which can produce power efficiently as the periods of the waves vary over a wide range; i.e., as the periodicity of the waves vary between "long" and "short".

It is also desirable to have WEC devices which can be efficient in response to heave and/or pitch motion to produce a substantial amount of power efficiently as the periods of the waves vary over a wide range.

SUMMARY OF THE INVENTION

In the discussion to follow and in the claims appended hereto reference to a WEC system or a WEC buoy is meant to include a container (also "can", "hull" or "shell") of any suitable shape, in which are located WEC devices. Waves impinging on the container cause it to move. The WEC devices contained in the container are designed to move in response to the movement of the container to produce useful energy (e.g., electric energy).

Applicant's invention is directed to a WEC system which is efficient and cost-effective when acted upon by waves whose periodicity varies over a wide range. This is accomplished by a WEC system which can function to produce useful energy (power) efficiently in response to heave motion and/or pitch motion and/or roll motion.

In accordance with one aspect of the invention, a WEC system includes a container in which is located two, or more, different types of WEC devices whose outputs are combined to produce a substantial amount of energy as the period and wavelengths of the waves vary over a range which extends from very short to very long. Some of the WEC devices produce energy more efficiently in response to long ("heave") waves and some of the WEC devices produce energy more efficiently in response to short ("pitch") waves. The outputs of the WEC devices are combined to produce a significant amount of energy over a wide range of wave period.

In accordance with another aspect of the invention, WEC devices embodying the invention include WEC devices with one reaction mass which are individually operable and which respond to heave and/or pitch (or roll). Several different embodiments are disclosed.

WEC devices suitable for inclusion in the container of a WEC buoy used to practice the invention may be characterized as: (a) being primarily "pitch" (or roll) driven and pitch (or roll) responsive; (b) being primarily "heave" driven and heave responsive; and (c) being a hybrid so as to be responsive to pitch (or roll) and heave (as a function of their location within a container).

A "pitch" driven WEC (PDWEC) device as the term is used herein, and as illustrated in the figures, refers to a WEC device which is designed to be primarily responsive to waves causing the plunging forward and backward ("pitching") of the WEC buoy. A "heave" driven. WEC device as the term is used herein, and as illustrated in the figures, refers to a WEC device which is designed to be primarily responsive to waves causing the WEC buoy to move up and down ("heave"). A pitch and/or heave (hybrid) WEC device as the term is used herein, and as illustrated in the figures, refers to a WEC device which is designed to be responsive to both pitch and heave (and roll).

The containers of WEC buoys used to practice the invention may have any shape (symmetrical and/or asymmetrical) designed to enhance the container's response to at least one of heaving, pitching or rolling and containing at least one WEC device to respond to pitch and at least one WEC device to respond to heave. The primarily pitch responsive WEC devices are generally located in the container along its outer periphery and the heave driven devices are generally located about the center of the container.

The WEC devices have power take off (PTO) devices which produce useful energy (e.g., electrical) in response to the motion of their respective WEC buoy containers.

BRIEF DESCRIPTION OF THE DRAWINGS

In the accompanying drawings which are not drawn to scale, like reference characters denote like components.

3

Figure 5:
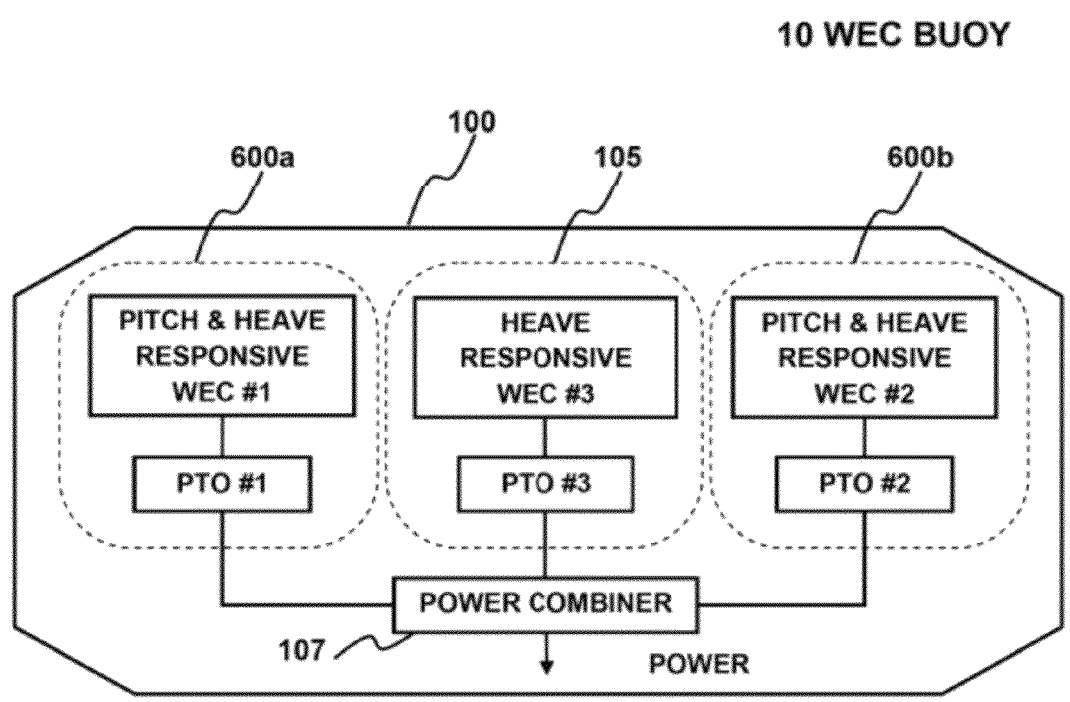
Figure 5A:
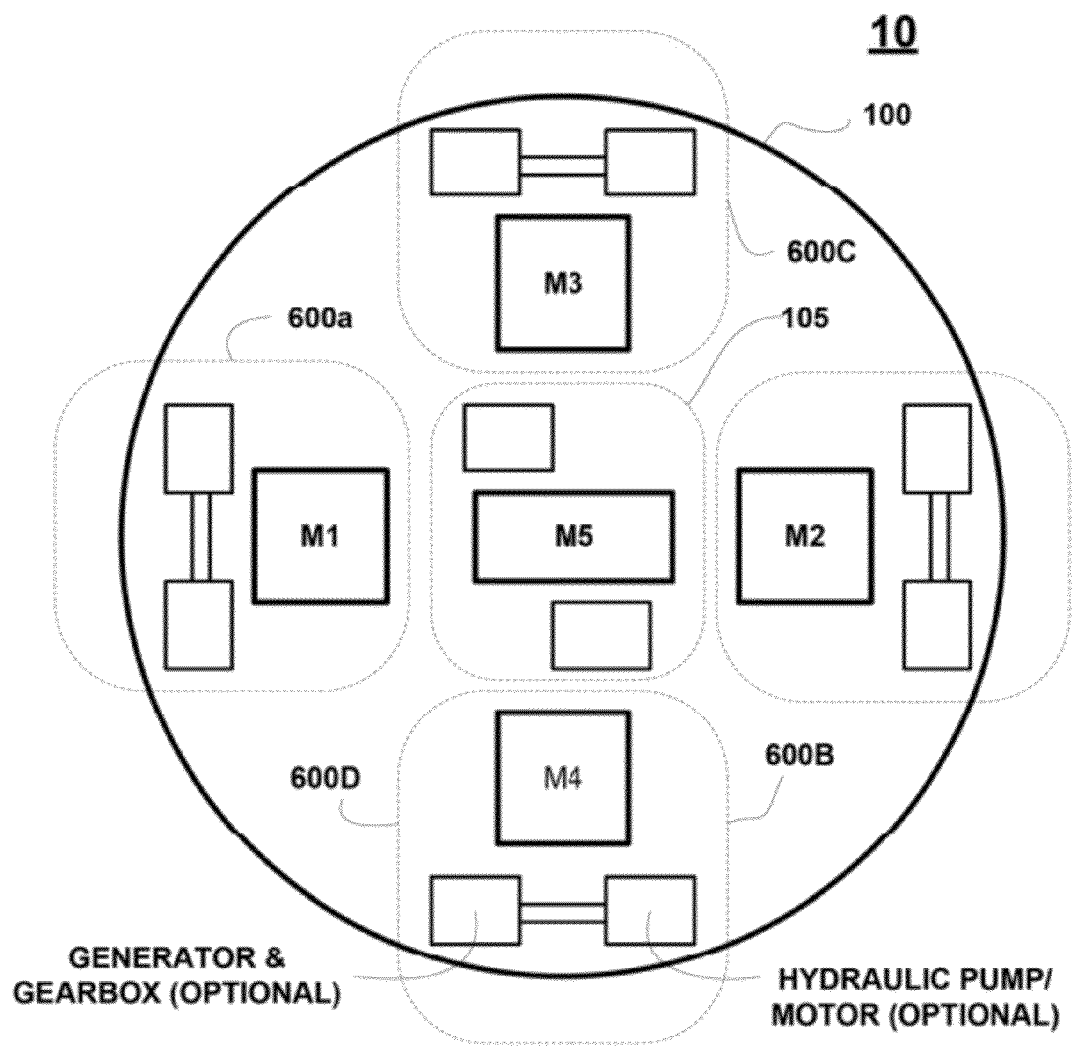
Figure 6:
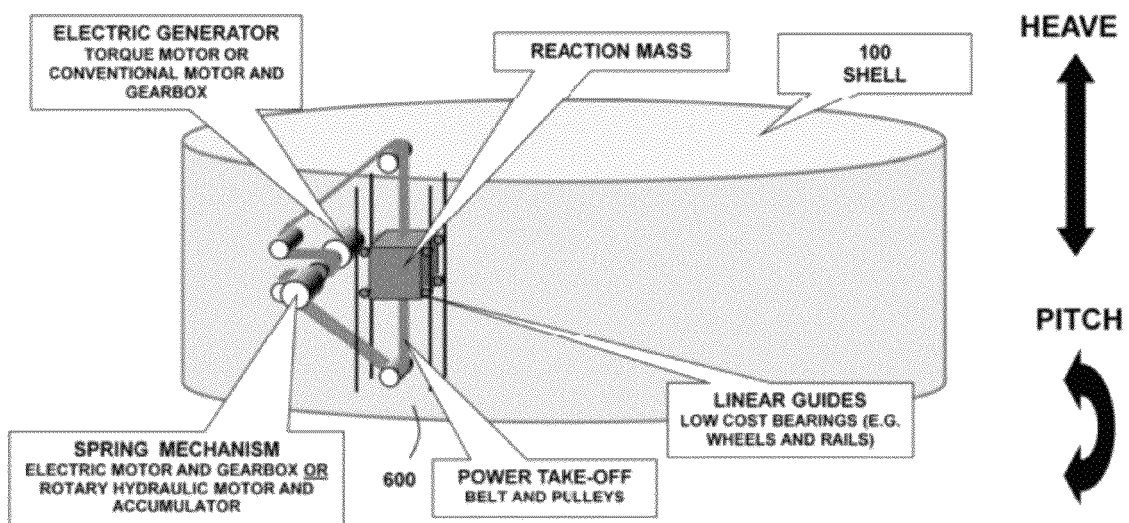
Figure 6A:
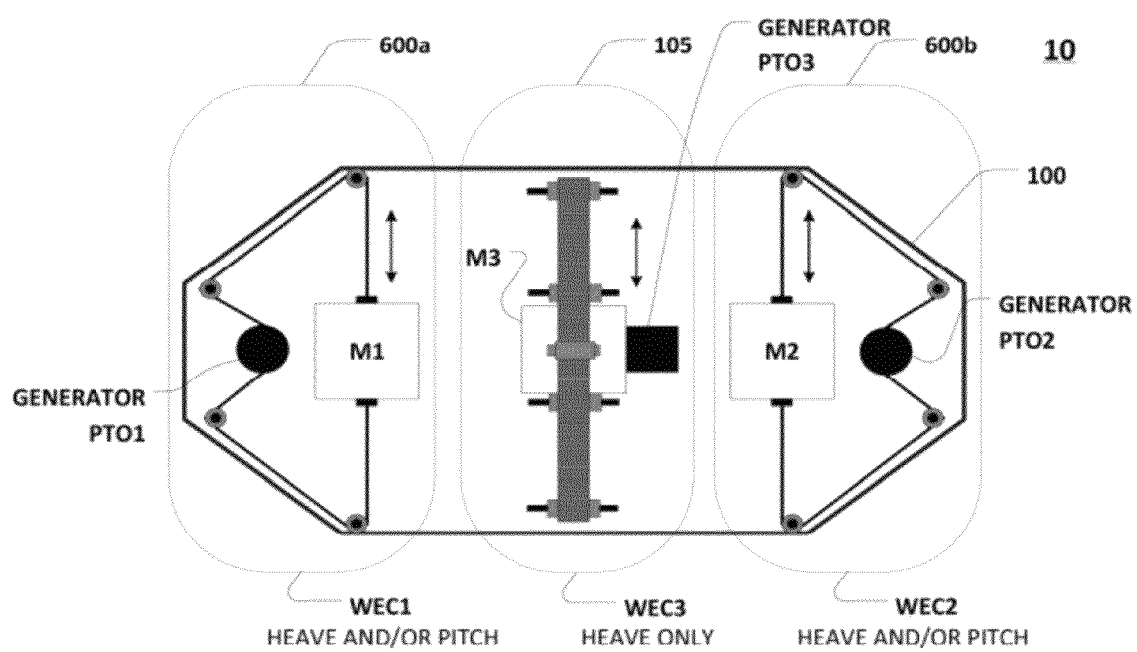
Figure 7A:
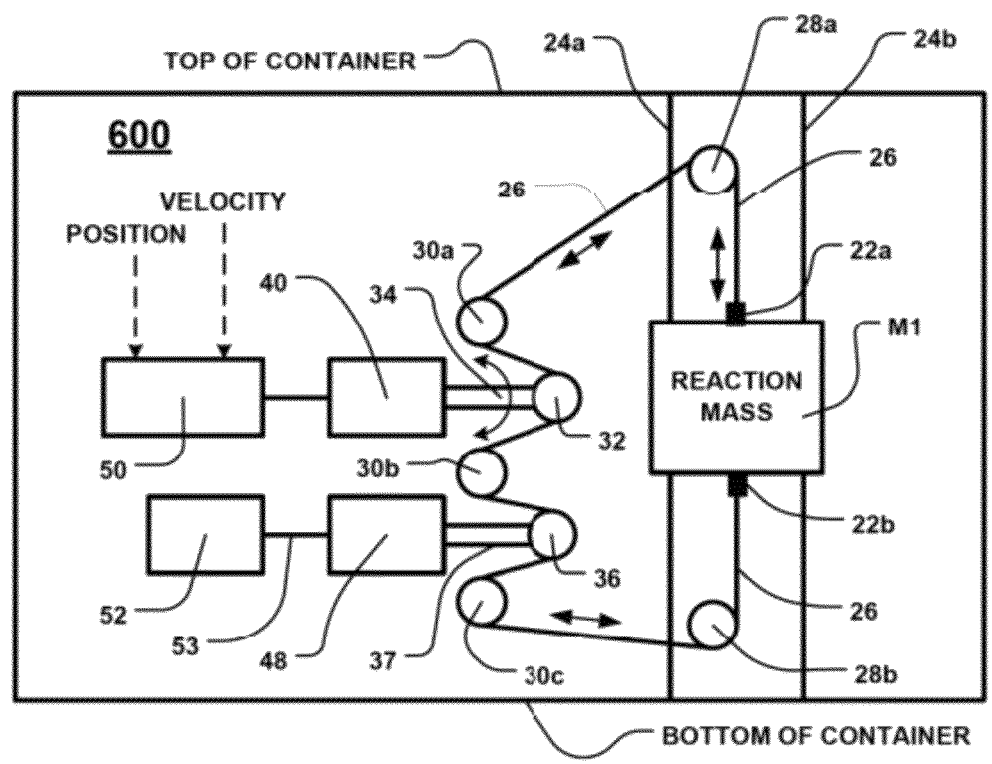
Figure 7B:
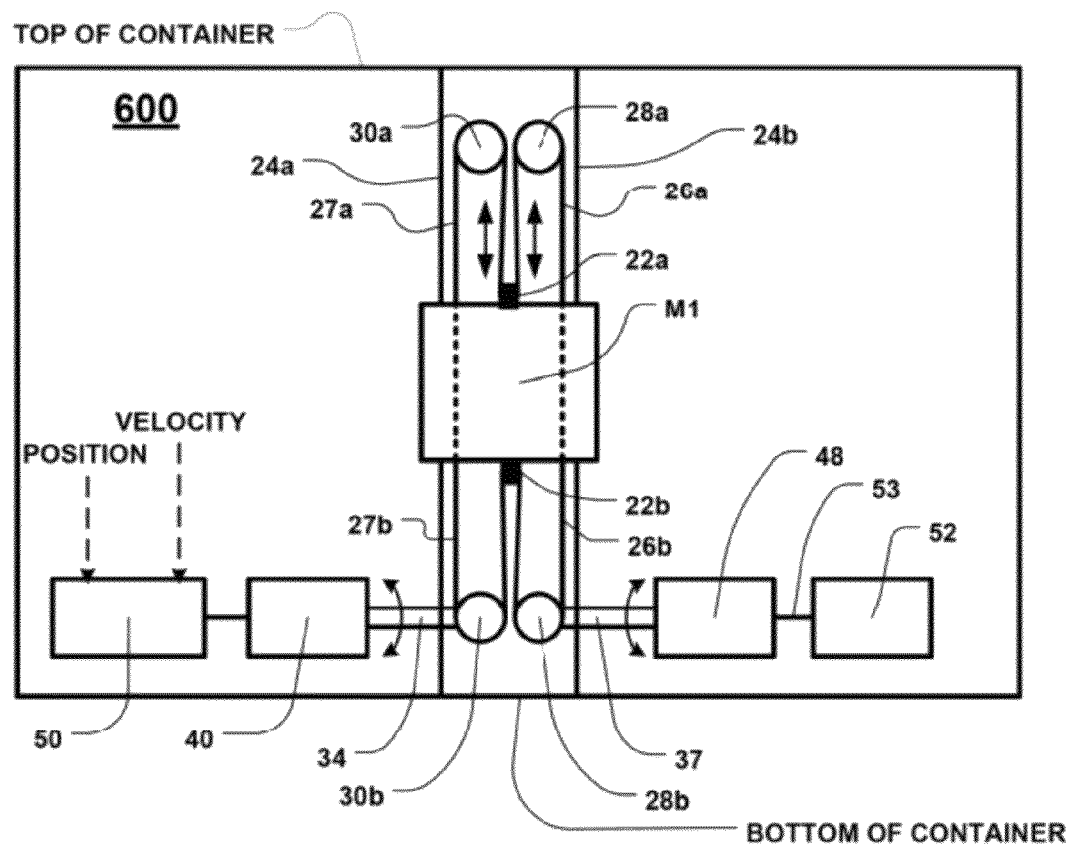
Figure 8A:
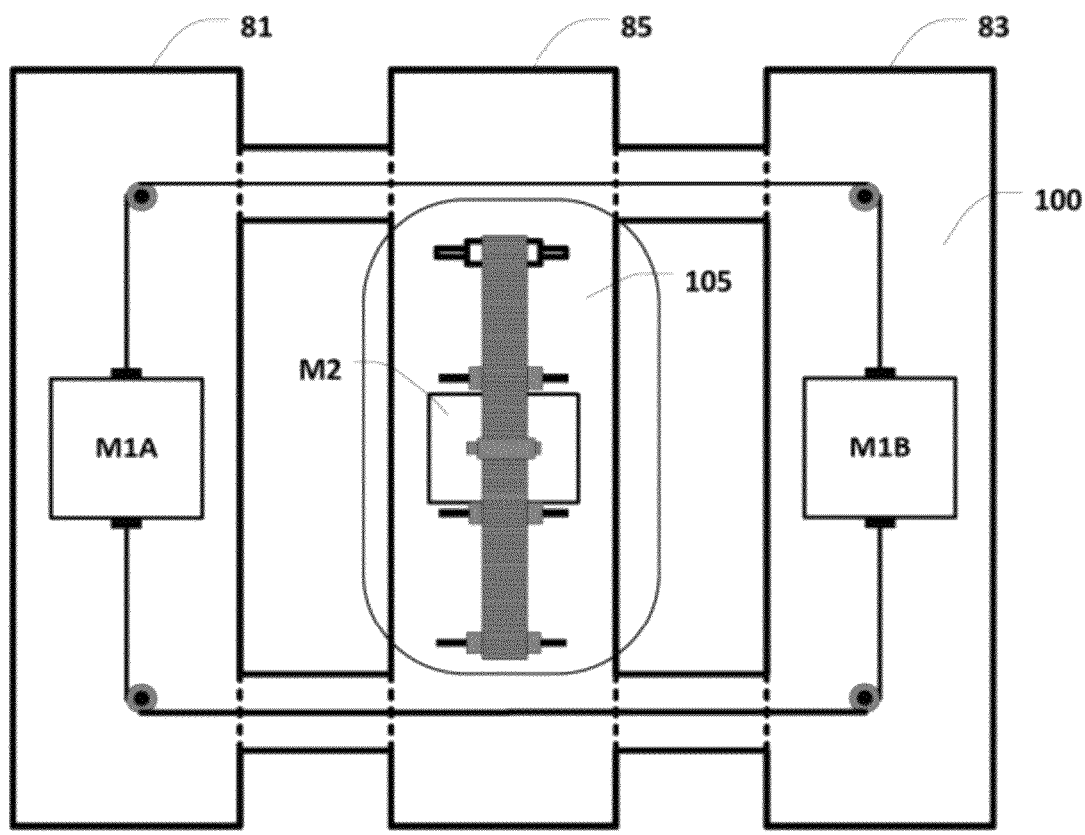
Figure 8B:
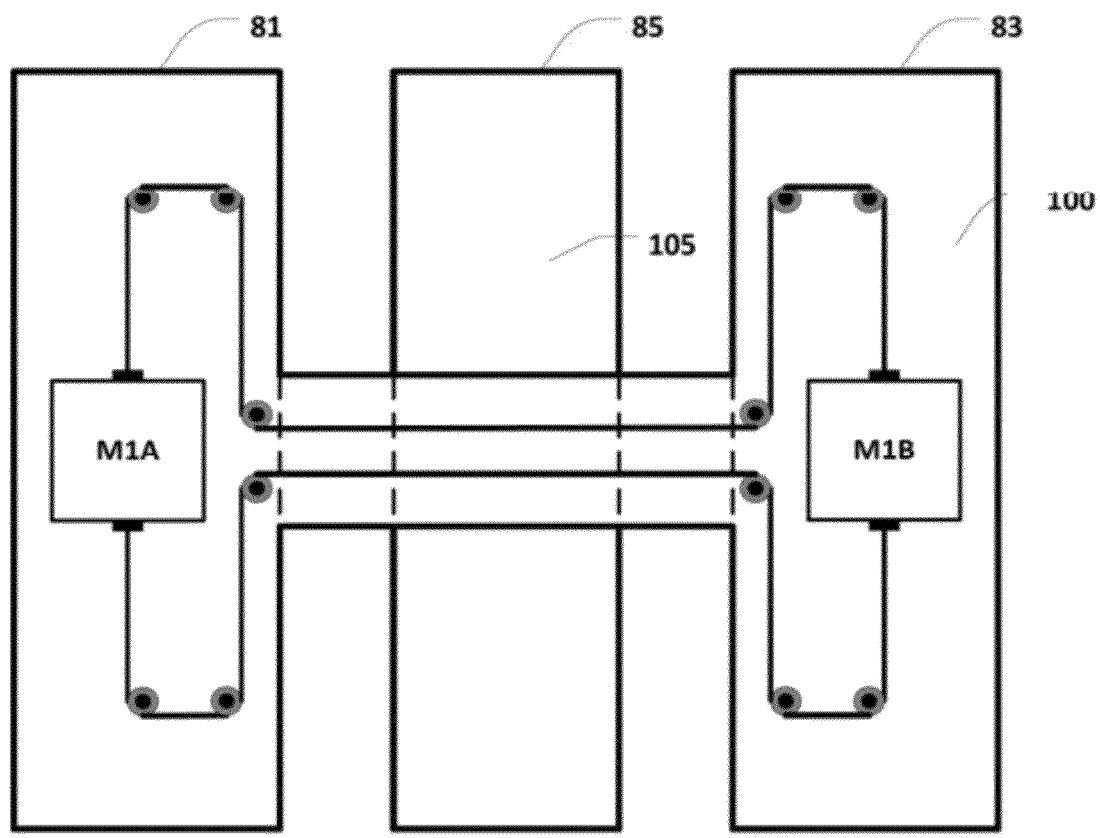
Figure 9:
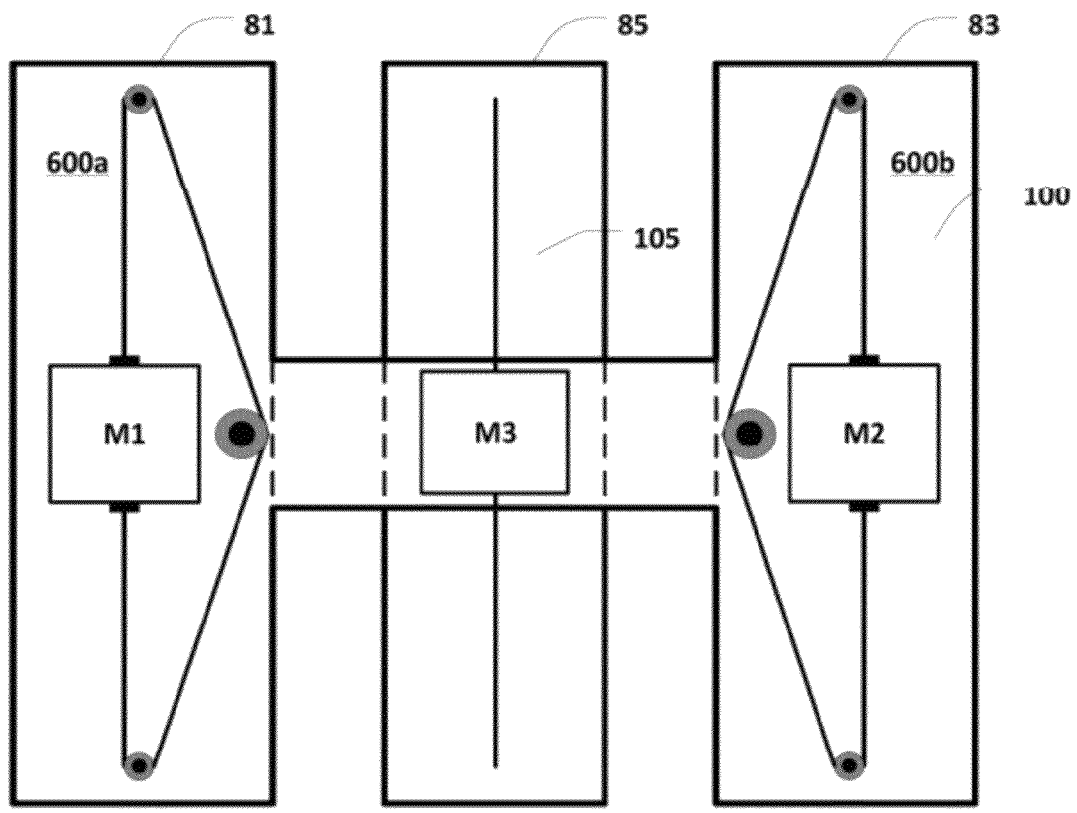

FIG. 5 is an idealized cross sectional view of a MMWEC buoy embodying the invention having pitch and heave responsive WEC (P&HWEC) devices along the periphery of the container and a centrally located heave responsive WEC device;

FIG. 5A is a highly simplified top view showing the distribution of P&HWEC devices along the outer periphery of a WEC buoy container and a heave responsive WEC device centrally located within the container;

FIG. 6 is an isometric view showing a P&HWEC device embodying the invention mounted within a container in accordance with the invention;

FIG. 6A is a highly simplified cross-sectional view of the P&HWEC device of FIG. 6 and a centrally mounted heave device;

FIG. 7A is a simplified cross-sectional drawing of a P&HWEC device of the type shown in FIG. 6 with a controller and a hydraulic spring;

FIG. 7B is a drawing of a modification to the WEC device of FIGS. 6 and 7A using two belts to minimize flexing;

FIGS. 8A, 8B and 9 are highly simplified cross sectional diagram of MMWEC buoys embodying the invention.

Figure 10:
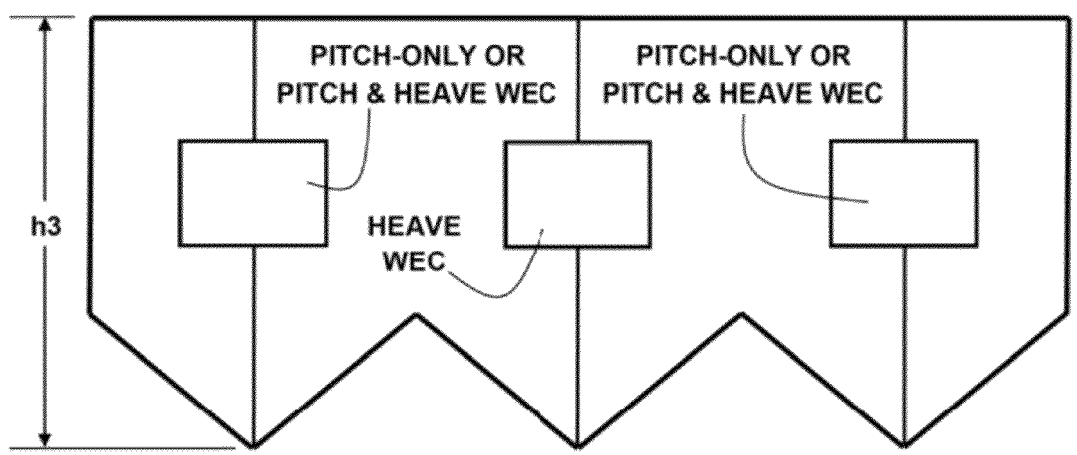

FIG. 10 is a highly simplified cross sectional diagram of a MMWEC buoy having a hull whose underside is of an irregular (triangular in the drawing) shape.

Figure 11:
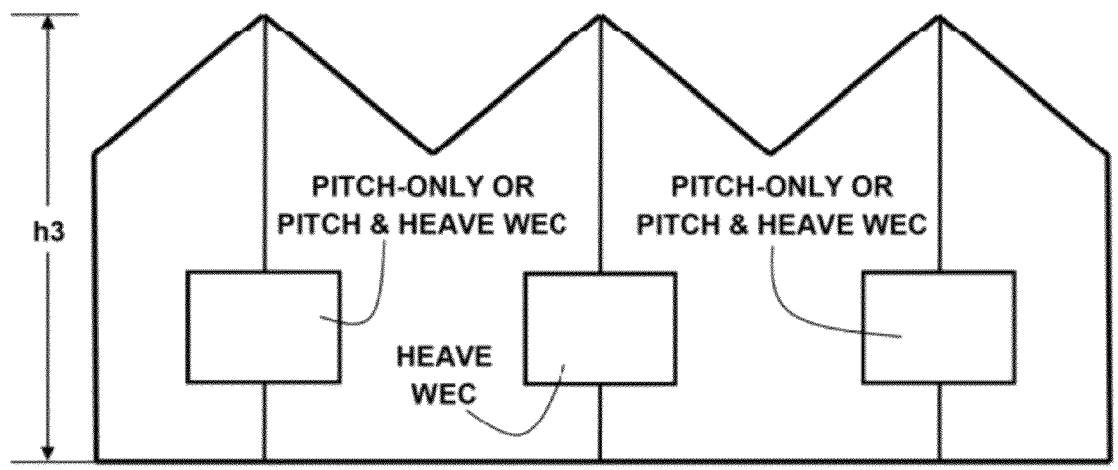
Figure 12:
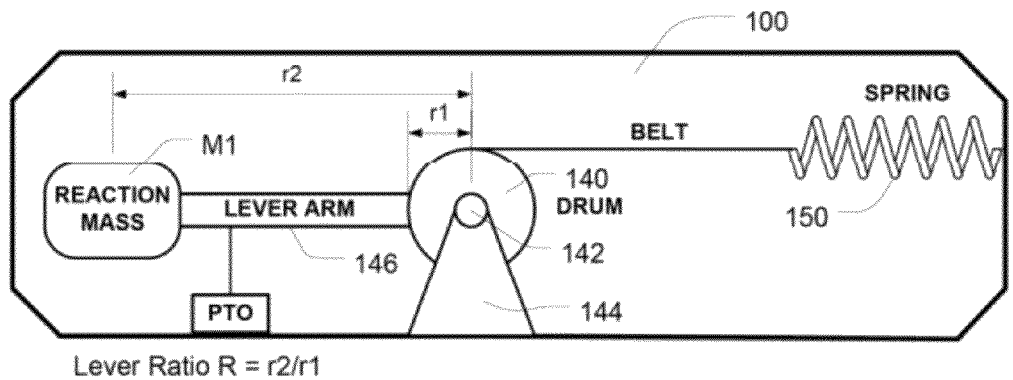
Figure 12A:
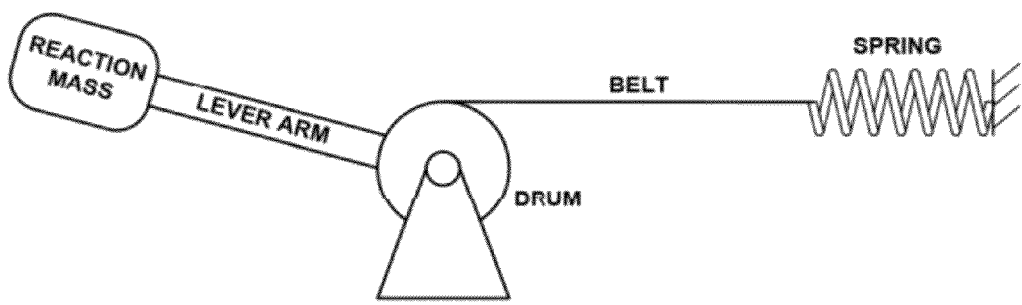
Figure 12B:
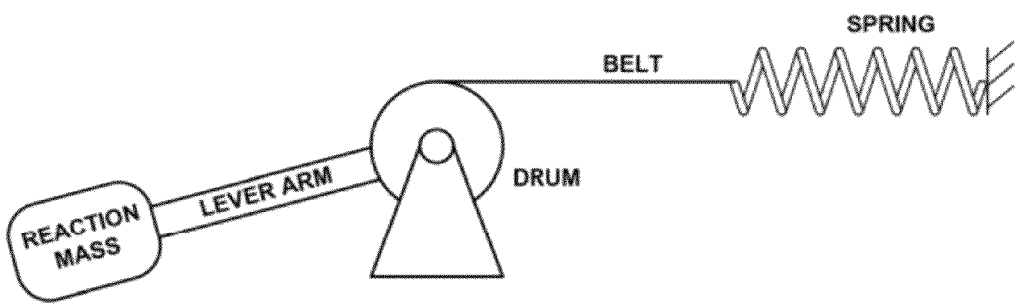
Figure 12C:
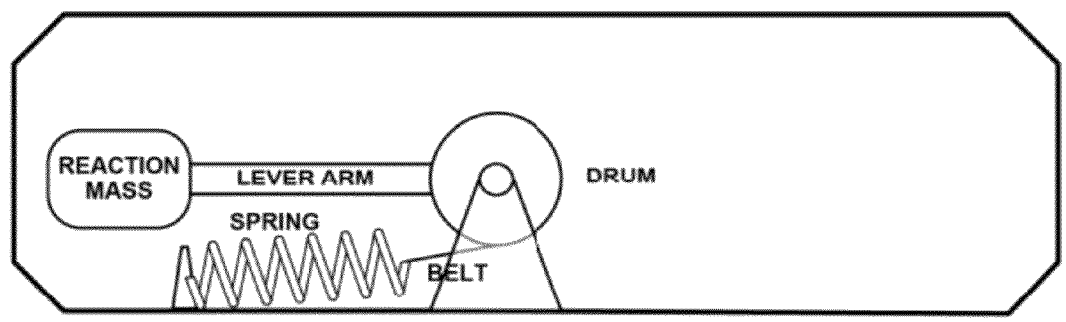
Figure 12D:
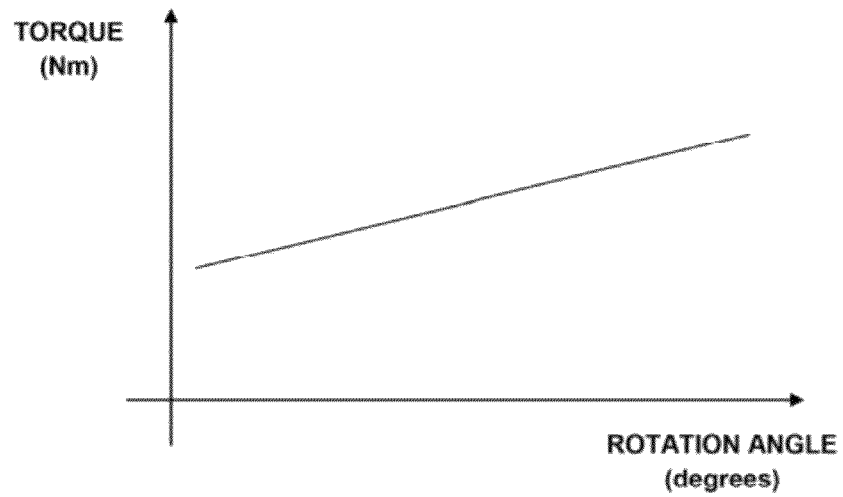
Figure 12E:
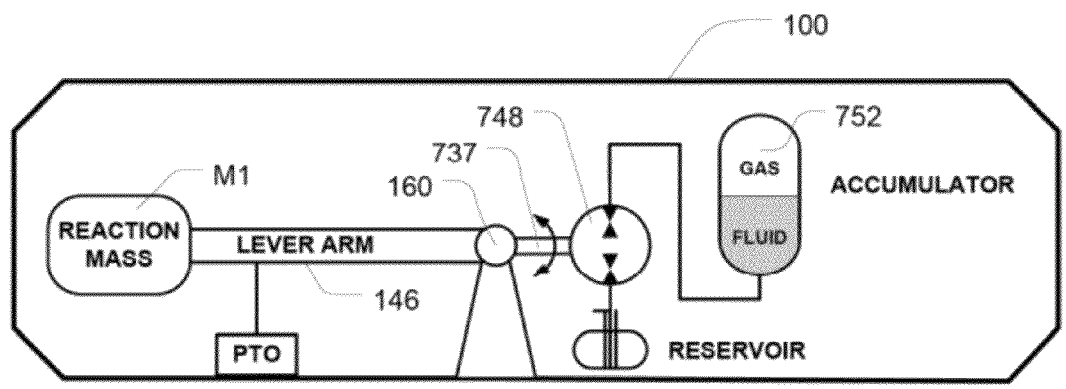
Figure 13:
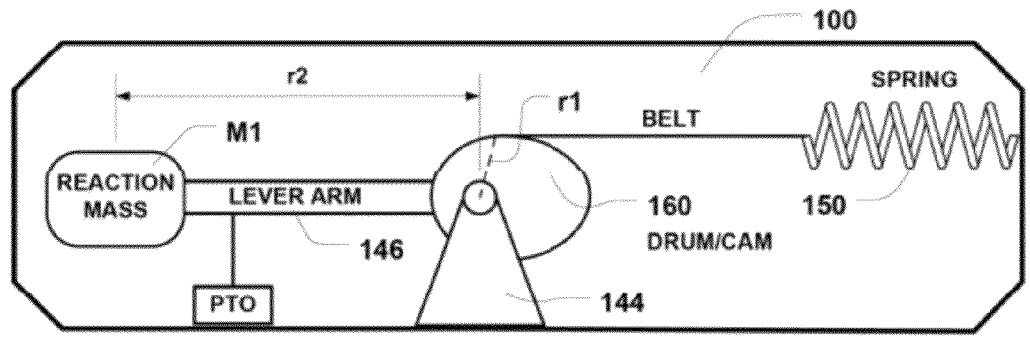
Figure 13A:
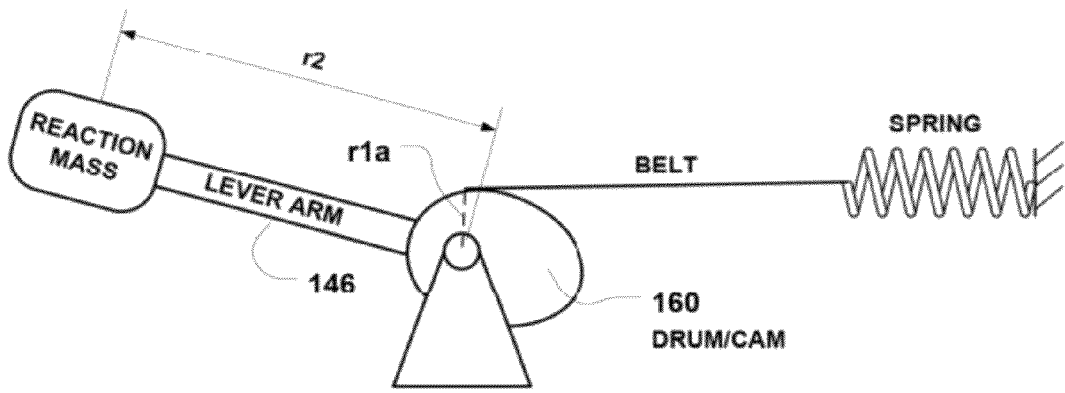
Figure 13B:
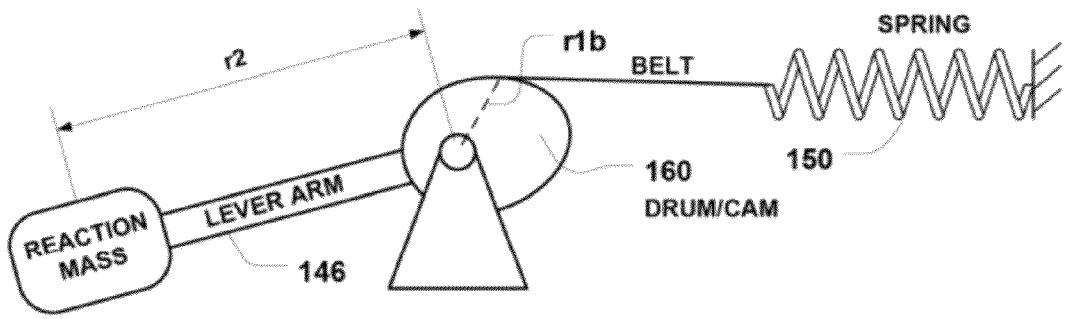
Figure 13C:
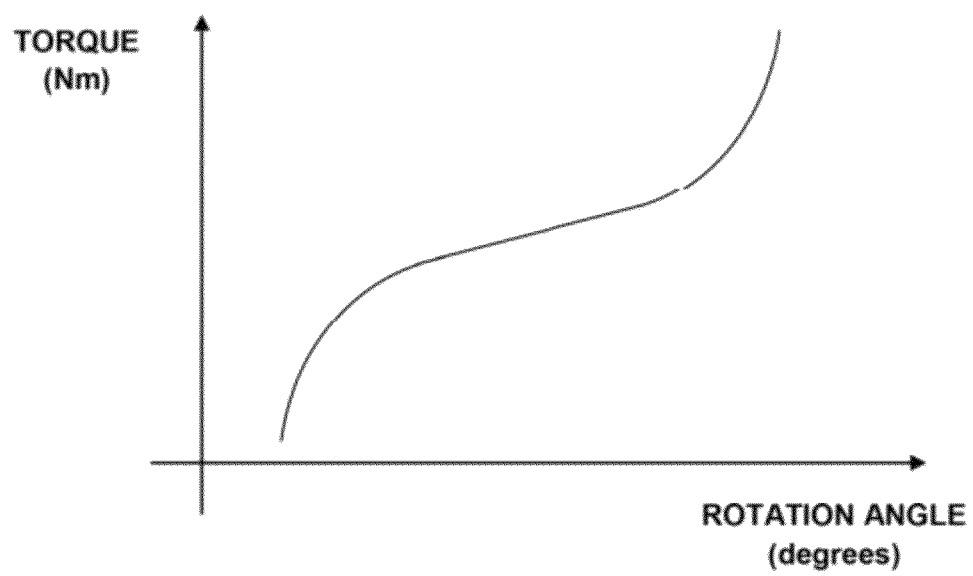
Figure 14A:
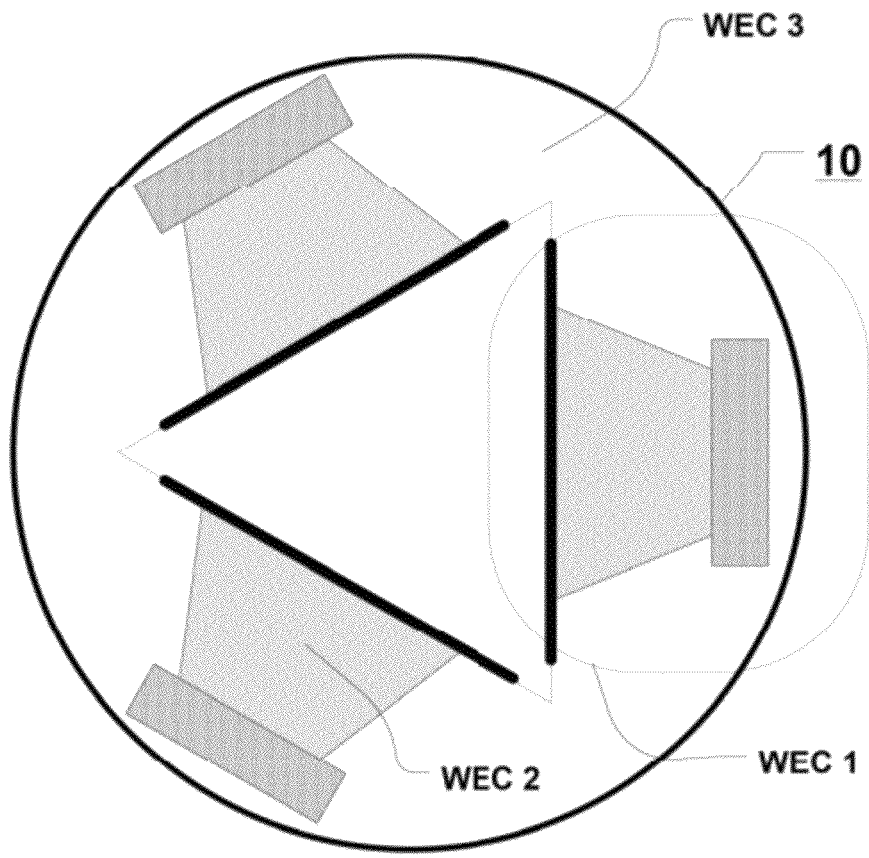
Figure 14B:
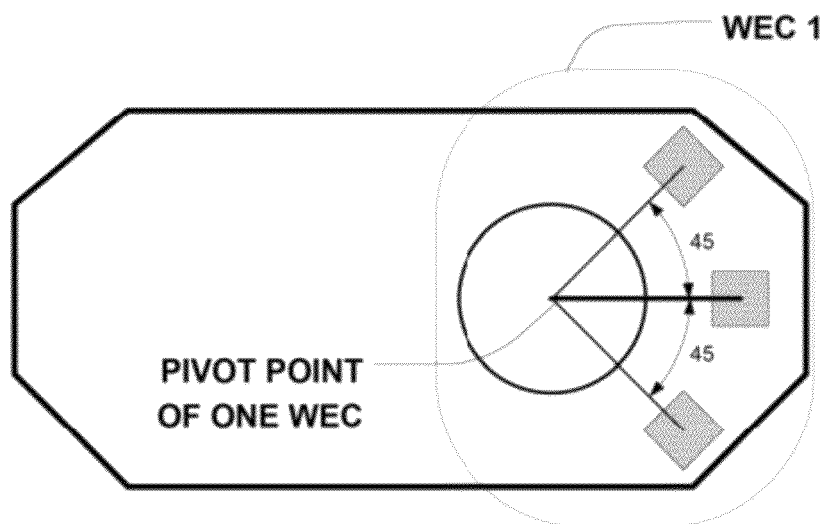
Figure 15A:
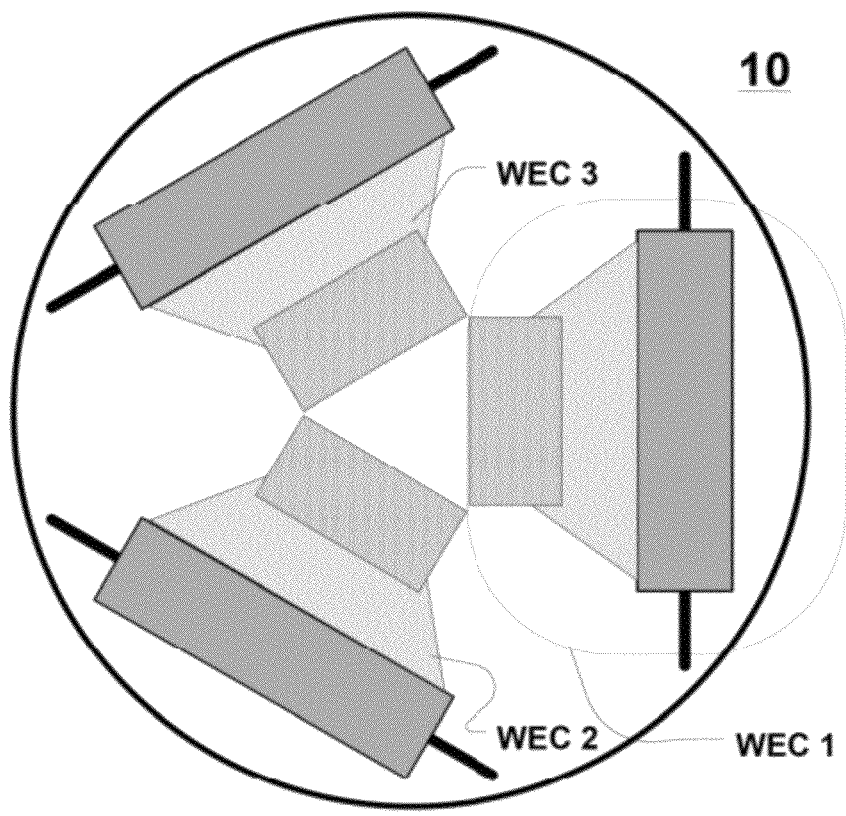
Figure 15B:
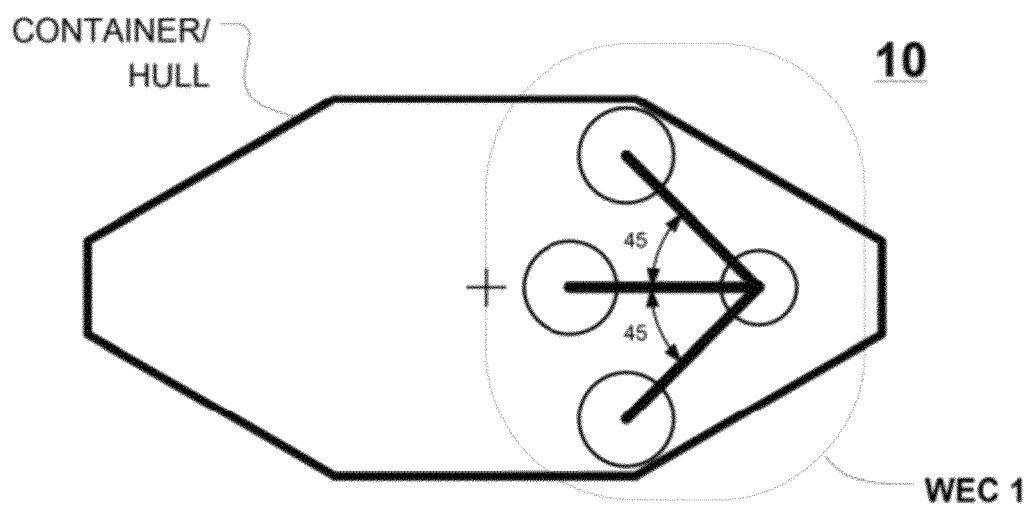
Figure 16:
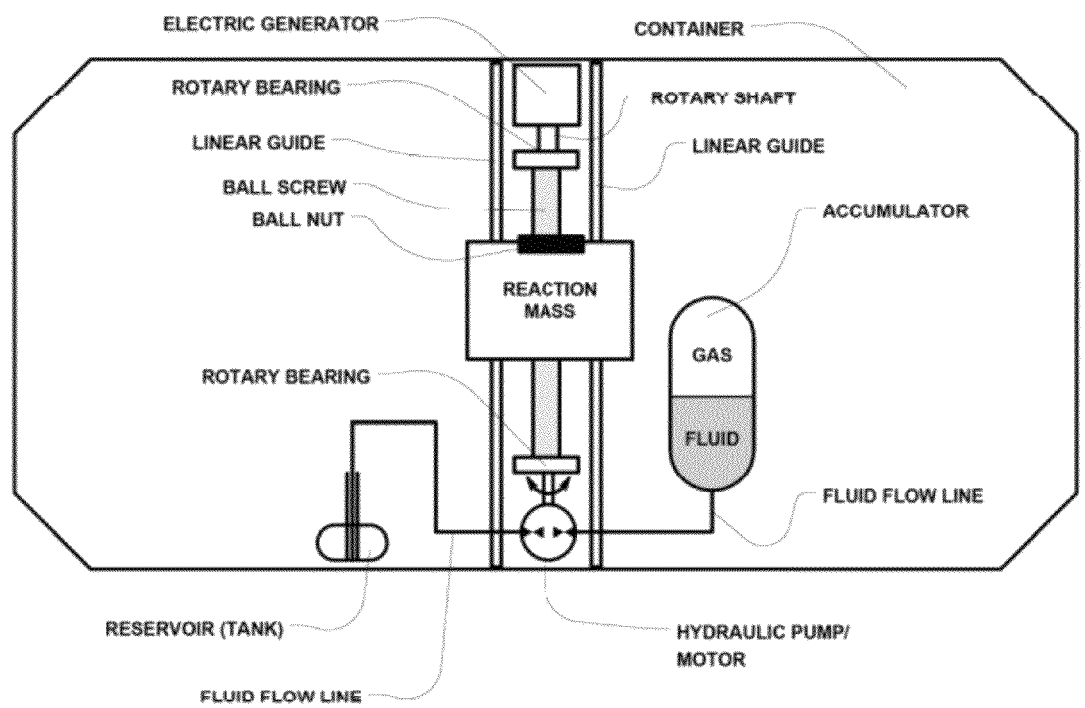

FIG. 11 is a highly simplified cross sectional diagram of a MMWEC buoy embodying the invention shaped to provide increased stroke for the WEC devices;

FIG. 12 is an illustrative diagram of part of a rotational mass P&H WEC device embodying the invention using a drum to which the reaction mass and a spring are coupled;

FIGS. 12A and 12B are diagrams illustrating movement of the WEC device of FIG. 12;

FIG. 12C is a diagram illustrating that the spring can be "tucked" under the reaction mass, or lever arm, to enable a decrease in the length of the container;

FIG. 12D is a graph showing that the torque applied by the spring in FIG. 12A is generally linear;

FIG. 12E is an illustrative diagram of part of a rotational mass P&H WEC device embodying the invention using a drum to which the reaction mass and a rotary hydraulic spring are coupled;

FIG. 13 is an illustrative diagram of a rotational mass P&HWEC device which may be used to practice the invention using a cam/drum to which a reaction mass and spring are coupled;

FIGS. 13A and 13B are diagrams illustrating movement of the WEC device of FIG. 13;

FIG. 13C is a graph showing the non-linear torque that may be produced using the WEC device of FIG. 13;

FIGS. 14A and 14B are top and cross-sectional views, respectively, of three (3) rotational mass WEC devices mounted to rotate along the outer periphery of a WEC buoy in accordance with the invention;

FIGS. 15A and 15B are top and cross-sectional views, respectively, of three (3) rotational mass WEC devices mounted to rotate within a WEC buoy in accordance with the invention; and FIG. 16 is a simplified representative cross-sectional diagram of a WEC device embodying the invention using an hydraulic spring.

DETAILED DESCRIPTION OF THE FIGURES

One aspect of this invention relates to a wave energy converter (WEC) system, or WEC buoy, which functions to combine the output of at least one "pitch-driven" (PD) wave energy converter (WEC) device with the output of at least one "heave" driven WEC device. In accordance with the invention, WEC devices which operate in different modes are contained within the same wave responsive enclosure (container) to produce power in an effective manner although the wavelengths of the waves vary over a very wide range.

Figure 1:
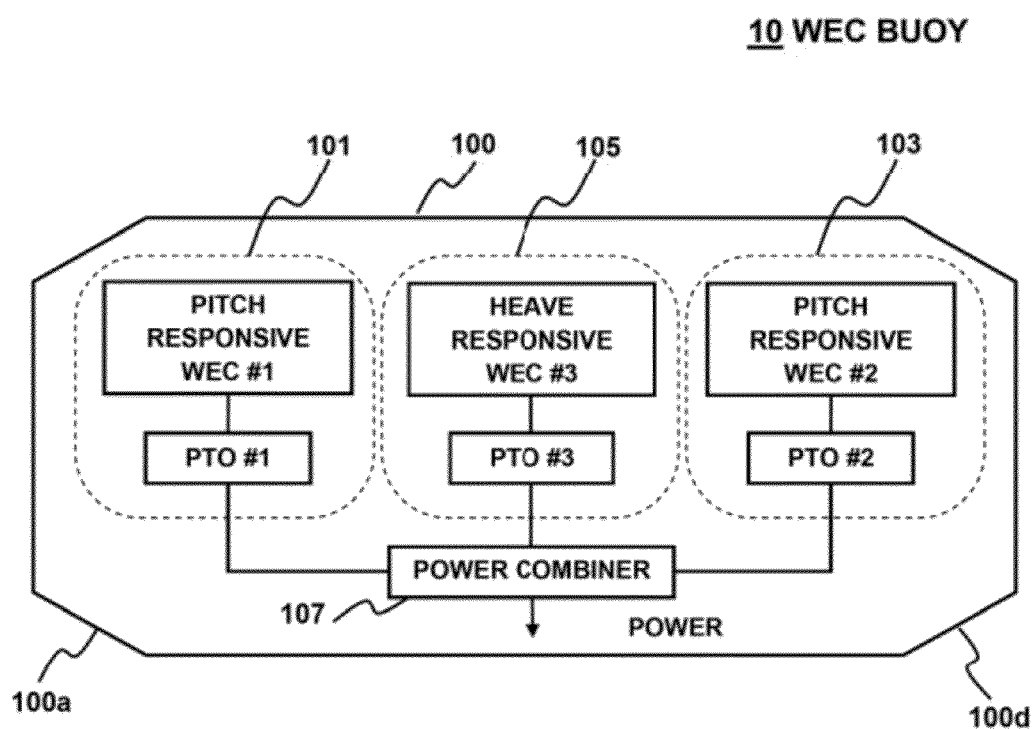
FIG. 1 is a highly simplified block diagram representation of a "multi-mode" WEC buoy using pitch responsive and heave responsive WEC devices in accordance with the invention.

Referring to FIG. 1, there is shown a WEC buoy 10 which includes a container 100 which contains: (a) "pitch" responsive WEC devices 101, 103 comprising WEC#1, WEC#2 and their respective power take off devices PTO#1, PTO#2; and (b) a "heave" responsive device 105 comprising WEC#3 and its respective power take off devices PTO#3. In FIG. 1, the outputs of the power take off devices (PTO#1, PTO#2 and PTO#3) are fed to a power combiner 107, whereby all the WEC devices contribute to the total power generated by the WEC buoy 10.

Generally, as further discussed below, the pitch (or roll) responsive WEC devices are located near the outer periphery of the container 100 and the heave responsive WEC devices are located about the center of the container. The container 100 may be designed and shaped to optimize response to certain motions of the waves and may be symmetrical or asymmetrical in shape. The container 100 may be designed so that it tends to pitch to the front and back more easily and/or heave more easily and/or roll more easily. In FIG. 1, the bottom left front end and the right bottom back end are shown to be angled to increase the front and back pitching of the container in response to wave action.

In response to "short" waves, the pitch (or roll) responsive WEC devices (e.g., 101, 103) will produce power more efficiently, and, in response to "long" waves, the heave responsive WEC devices (e.g., 105) will produce power more efficiently. Thus, in accordance with the invention, a WEC buoy responds to, and extracts energy from, heave, pitch and roll forces/motions of the waves. Thus, a MMWEC buoy includes different types of WECs within the same container. A number of different pitch (or roll) driven WEC devices may be used to practice the invention (see FIGS. 2, 2A, 2B). Likewise, a number of different heave driven WEC devices may used to practice the invention (see FIGS. 6, 12, 13).

Figure 2:
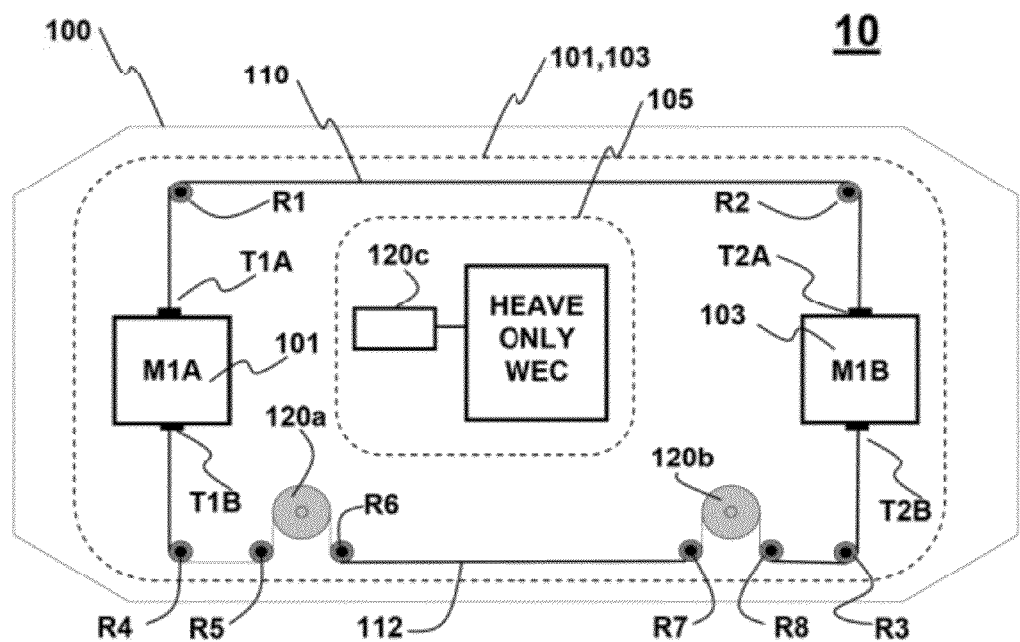
FIG. 2 is an idealized cross sectional view of a "multi-mode" WEC (MMWEC) buoy embodying the invention illustrating the use of a PDWEC device and a centrally located heave driven WEC device.

FIG. 2 is a simplified cross-sectional diagram showing a pitch driven WEC (PDWEC) device (101, 103) whose reaction masses are located along the outer periphery of a container 100 and a heave responsive WEC device 105 shown in block form centrally located within the container 100. Each PDWEC device includes a reaction mass M1A located at one end (e.g., the front or left end of the container in FIG. 2) and a reaction mass M1B located at another end (e.g., the back or right end of the container in FIG. 2) of the container 100. As shown in FIG. 2, the reaction masses M1A and M1B of each PDWEC device are preferably located along the outer periphery of the container 100.

The mass M1A has a top connection terminal T1A and a bottom connection terminal T1B. Similarly, mass M1B has a top connection terminal T2A and bottom connection terminal T2B. Terminal T1A is coupled to terminal T2A via cable/belt 110 which winds over rollers R1 and R2. Terminal T1B is coupled to terminal T2B via a cable/belt 112 which winds around rollers R4 and R3. In FIG. 2 there are two electric generators 120a and 120b which are disposed along the base of the container 100 between rollers R4 and R3 such that the generators are driven when the cable/belt 112 moves back and forth. The belt 112 winds from roller R4 about roller R5 then around generator 120a and roller R6 and then along the base of the container to wind around roller R7, generator 120b and roller R8 and then around roller R3 to terminal T2B. The two reaction masses tend to move up and down in opposite direction in response to pitching motion of the buoy 10 and container 100.

In FIG. 2, reaction masses (M1A and M1B) are coupled to each other via a mechanical linkage such that when a reaction mass at one end of the container is urged upward, the reaction mass at the opposite end of the container is urged downward. In response to surface waves the front and back ends of the hull are repeatedly pushed upward and downward causing movement of the reaction masses. The movement of the paired reaction masses drives a power take off (PTO) mechanism (e.g., generators 120a, 120b) which converts the motion of the reaction masses and their coupling mechanism into useful energy (e.g., electrical energy). Thus, when the waves cause pitching of the WEC buoy 10, the PDWEC devices produce a significant electrical output.

Figure 2A:
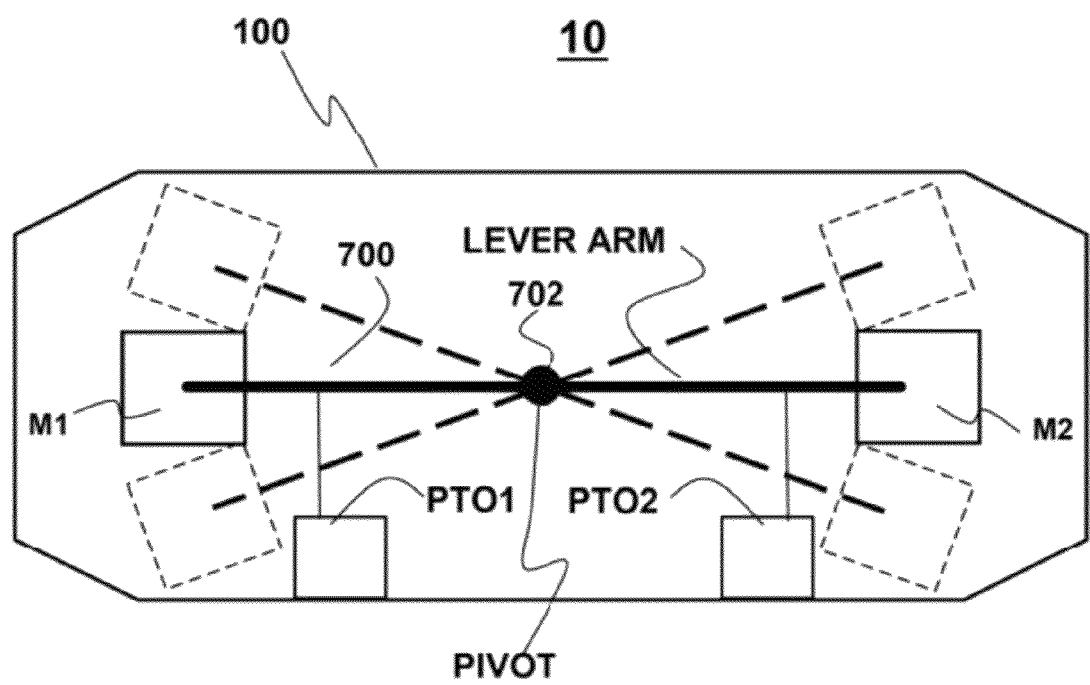
FIGS. 2A and 2B are highly simplified cross-sectional diagrams of other PDWEC devices which may be used in combination with a centrally located heave driven WEC device to practice the invention.
Figure 2B:
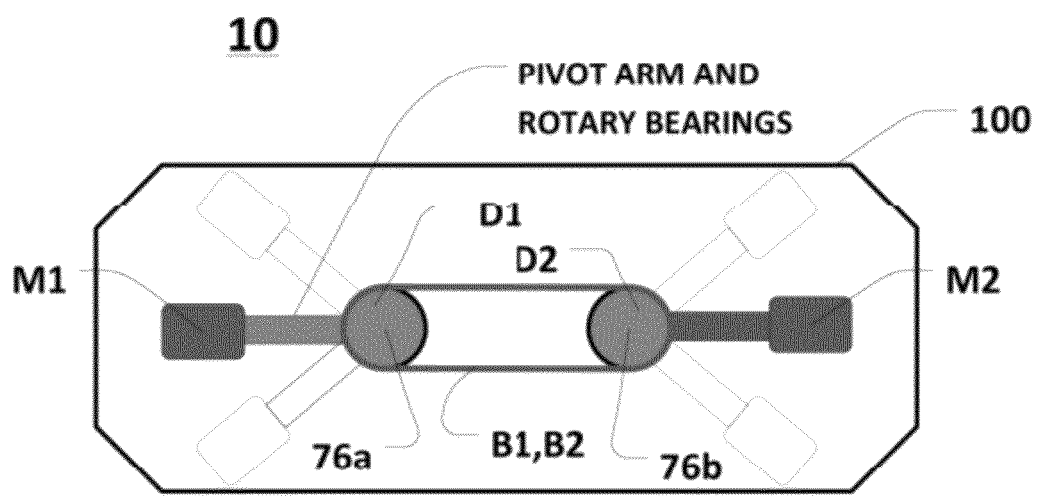

Other PDWEC devices which may be used to make WEC buoys embodying the invention are shown in FIGS. 2A and 2B, which are highly simplified cross-sectional diagrams. FIG. 2A shows a PDWEC having two reaction masses which are positioned at opposite ends of a rigid lever arm. FIG. 2B shows a PDWEC having a pair of rotating reaction masses mounted on lever arms which rotate about a pivot. The operation and structure of these PDWECs are more fully detailed in co pending application titled PITCH DRIVEN WAVE ENERGY CONVERTER DEVICES AND SYSTEMS, being filed simultaneously herewith and assigned to the same assignee as this application and whose teaching are incorporated herein by reference.

Figure 2C:
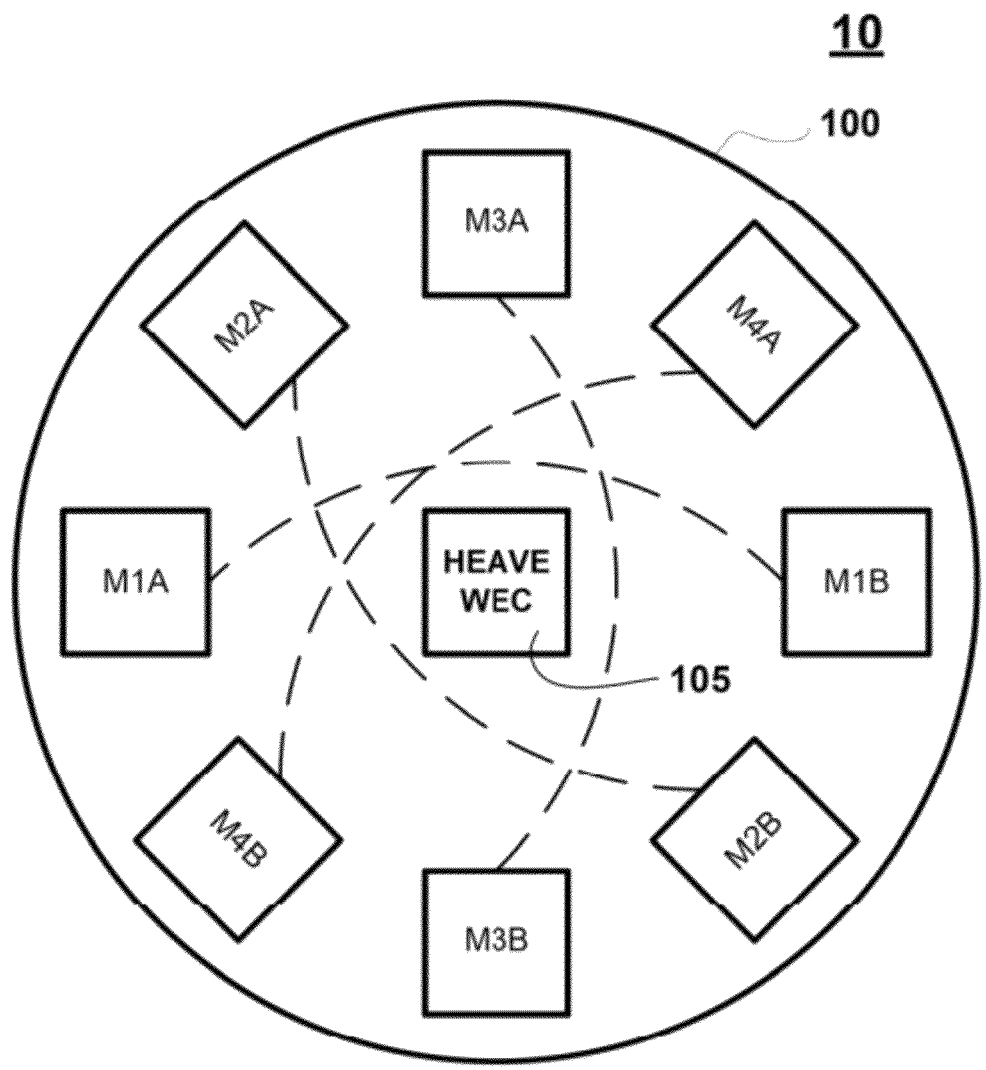
FIG. 2C is a highly simplified symbolic top view of a WEC buoy containing PDWEC devices and heave responsive WEC devices, in accordance with the invention.

FIG. 2C shows a heave responsive WEC device centrally located within container 100 and four (4) sets of PDWEC devices whose reaction masses are distributed around the periphery of the container. The paired reaction masses (M1A, M1B; M2A, M2B; etc. . . . ) of each set of PDWEC devices may be interconnected as shown in FIG. 2 or in any suitable manner. The reaction masses may be coupled to each other and to a PTO via a simple coupling linkage such as a cable or belt, as shown, or alternatively, via a hydraulic or pneumatic apparatus. The PTO may be a completely separate unit. Alternatively, it may be more effective to use the coupling mechanism as part of the PTO.

Figure 4:
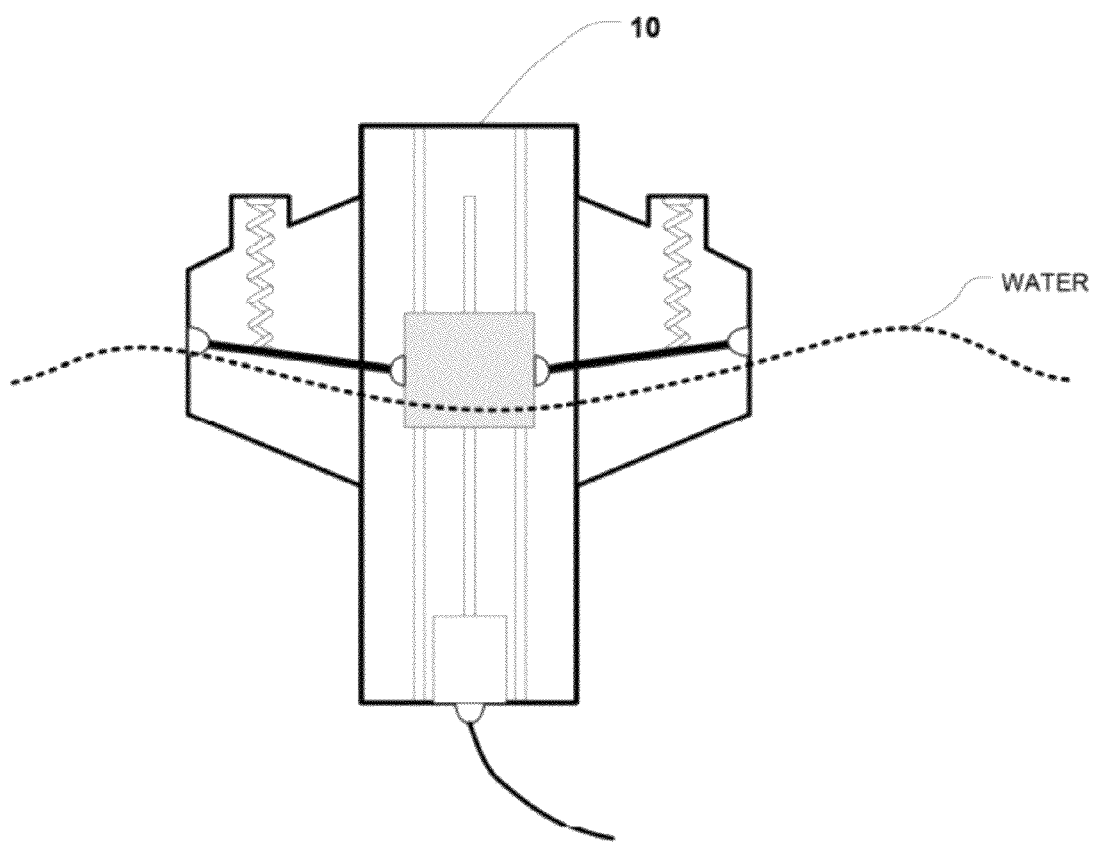
FIG. 4 is a simplified cross sectional diagram of a prior art heave responsive WEC device which may be used to practice the invention.

The heave responsive WEC device 105 centrally located about the container 100 may be, for example, of the type shown in, prior art, FIG. 4 or as shown in U.S. Pat. Nos. 7,443,046 and 8,067,849. Any other suitable heave responsive device may be used to practice the invention. The heave responsive WEC device is preferably located about the portion of the container (e.g., the center) where the effect of the heave motion is most pronounced.

Figure 3:
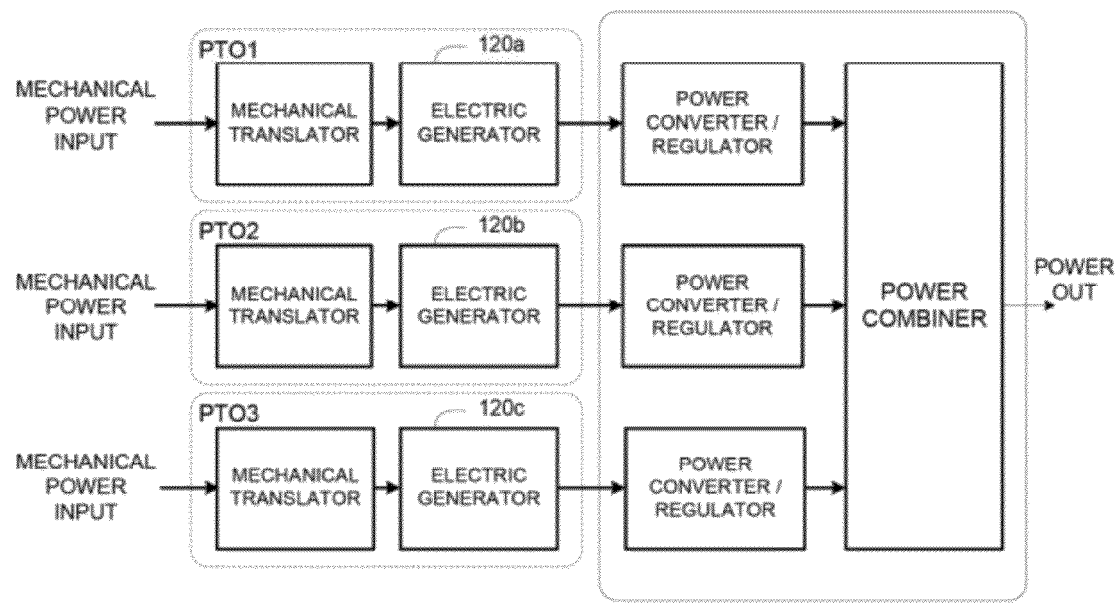
FIG. 3 is a highly simplified block diagram of power combining circuitry of the WEC system of, for example, FIGS. 1 and 5.

As shown in the figures (e.g., FIGS. 1, 5) each one of the WEC devices has a PTO which may include an electric generator which produces electrical energy. The generator outputs can be combined as shown in FIG. 3 which illustrates that the outputs of the individual PTOs and their generators (120a, 120b, 120c) may be processed by a power converter/regulator and fed to a combiner/processor 107 to produce a power output which is the sum of the outputs of all the PTOs of the WEC buoy 10.

WEC Buoy with Pitch/Heave and Heave Responsive WEC Devices:

FIGS. 5 and 5A show pitch and heave WEC devices (600a, 600b) located along the outer periphery of container 100 and a heave responsive WEC device 105 positioned about the center of the container. In FIGS. 5, 5A and 6A there is shown a WEC device 600a positioned at the front end (left in FIGS. 5, 5A) of the buoy 10 and another WEC device 600b positioned at the back end of the buoy 10 (right in FIGS. 5, 5A).

WEC devices 600a, 600b (which may be of the type shown in FIG. 6, 6A, 7A or 7B, or 12 or 13) can produce power in response to pitching (or rolling) motion and/or to heaving motion, depending on their location in the container. Therefore, these WEC devices which can respond to pitch (or roll) and/or heave (e.g., 600a, 600b) may be referred to as P&HWEC devices or as "hybrids". A MMWEC buoy could contain many P&H WEC devices 600. The heave responsive device 105 may be any suitable heave responsive WEC device, including a P&HWEC device 600.

FIG. 6 is a highly simplified isometric drawing of a container for a WEC system 10 embodying the invention and a cutaway view showing a P&H WEC device 600 embodying the invention. The WEC device 600 includes a reaction mass which can go linearly up and down guided by guide rails or some other sort of guiding system. Belts or cables transfer mechanical power from the reaction mass to one or more electric generators. A spring mechanism (or counterbalance type device) is needed to keep the reaction mass near the center of travel. As the buoy container moves back and forth or heaves up and down, the reaction mass will move up and down about this nominal position. The spring mechanism function can be performed by hydraulic, pneumatic, electro-mechanical (see FIG. 7A or 7B) or mechanical spring devices. The spring function may be performed by a device that exerts force in a linear fashion (e.g. hydraulic cylinder with gas charged accumulator) on the mass or a device that exerts torque in a rotary (torsional) fashion on one or more of the pulleys.

In FIGS. 6, 6A, 7 and 7A, the reaction mass of the WEC device 600 is constrained to up and down movement and it can be contained within a relatively narrow space. Accordingly, a MMWEC buoy 10 of the type shown in FIGS. 5, 5A, 6 and 6A can hold several P&HWEC devices 600. In FIG. 6 the container is shaped like a "tuna can", but the container may have any suitable shape (e.g., the hull of a ship). In response to up or down (heave) motion or to forward and backward (pitching) motion of the can 100, the reaction mass will tend to move and drive belts or pulleys wound around sprockets causing rotational movement to generators linked to the sprockets.

FIG. 6A is an idealized cross sectional view of a MMWEC buoy whose container 100 includes P&HWEC devices 600a and 600b at opposite ends of the container 100 with a heave responsive device 105 located about the center of the container. The reaction masses (M1, M2) of the "fore" and "aft" WEC devices 600a, 600b are not mechanically (or otherwise) coupled to each other and can respond to both heave and pitch (or roll) forces and motions of the WEC buoy. The reaction masses may be coupled to via toothed belts to electric generators (PTOs) with sprockets whose teeth engage with the toothed belts to resist the movement of the belt(s) and extract energy from the motion of the reaction masses.

FIG. 7A is cross sectional view of part of a container 100 showing a simplified cross sectional view of a P&HWEC device 600 (similar functionally to the WEC devices 600 shown in FIGS. 5 and 6). The WEC device 600 is capable of: (a) efficiently responding to pitch, heave, and/or roll motions and forces when located in the front or back or, in general, along the outer periphery of the can 100; and (b) efficiently responding to heave motion and forces if located generally around the center of the can 100.

FIG. 7A shows a reaction mass M1, having a top attachment terminal 22a and a bottom attachment terminal 22b, which can go up and down between guide rails 24a, 24b. A belt/cable 26, firmly attached to a top terminal 22a, extends from terminal 22a and is wound around a top pulley/roller

28a. The cable 26 then extends around pulley/roller 30a and is wound around a pulley 32 which drives via a shaft 34 an electric generator 40 (i.e., a PTO). The cable 26 extends around pulley/roller 30b and then goes around a pulley 36 and then extends around a bottom pulley/roller 28b and then extends to terminal point 22b to which it is firmly attached. The roller/pulley 36 drives a shaft 37 coupled to a rotary hydraulic pump/motor 48 which controls fluid flow into an accumulator 52 via fluid line 53. The pump/motor 48 and the accumulator may be used to provide a spring function which can handle the gravitational forces due to the large weight of the reaction mass and tend to return the reaction mass to the center of its travel.

The hull 100 is intended to move in response to the waves in the body of water in which it is placed. In response to the waves and corresponding movement of the hull 100 the reaction mass M1 moves up and down along the guide rails (24a, 24b) between the upper roller 28a and the lower roller 28b. Stops (not shown) may be used to prevent the reaction mass from hitting the rollers. As the reaction mass moves the cable 26 causes the generator 40 to rotate and produce electrical energy. The generator may be driven directly via the belt 26 or via a gearing mechanism. As in FIG. 3, the generator output may be processed and then fed to a power combination circuit.

In FIG. 7A an additional "spring mechanism" may be provided by controller 50 and generator 40. Controller 50 is coupled to generator/motor 40 which can also be used to tend to force the reaction mass towards the center of travel. Signals indicative of the position and velocity of the reaction mass are inputted to controller 50 which is connected to, and controls the operation of, generator 40. The generator may be programmed (controlled) to behave like a spring. Using a position sensor (not shown), the controller 50 may cause the generator to act like a motor by generating a force to maintain the reaction mass at the center of its up/down travel distance. This is a "spring" action and the spring stiffness can be tuned to the sea conditions (specifically wave period) so as to optimize wave energy harvesting. Alternatively, the spring mechanism may include the use of a mechanical spring or other mechanisms.

When the generator 40 extracts energy (or is programmed to do so) it behaves like a damper. The "damper" action occurs when the controller 50 senses reaction mass velocity (and sometimes position) and in response controls generator current to resist the motion of the reaction mass. In this mode of operation, the generator torque resists (via the belt) the motion of the reaction mass. Increasing velocity results in increasing generator torque, as controlled by the controller. The generator behaves like a spring when the controller controls generator current in such a way as to apply a force to the belts to keep the reaction mass centered. The force is increased as the reaction mass travels farther from the midpoint, just as a mechanical spring would increase force as the displacement increases.

FIGS. 6 and 7A, show a spring implementation using one belt. To obtain good contact (gripping) between the belt and the rollers, various sub-rollers or pulleys are introduced. However, a possible deficiency is that the belt flexes in both clockwise and counter clockwise fashion as it passes over some of the pulleys and sprockets. This could result in shortening the useful life of the belt. This deficiency may be resolve by using a "balanced" two belt (26a, 26b; 27a, 27b) system as, shown in FIG. 7B. Otherwise, the PDWEC shown in FIG. 7B is operated like the one shown in FIG. 7A and functions in a similar manner in response to heave, or pitch or, roll or a combination of all three.

In FIG. 7B, the belt passes through a conduit in the reaction mass. However, the two pulleys (30a, 30b) and the belts may be rearranged such that the belts do not have to pass through the reaction mass. In FIG. 7B another set of belts (26a, 26b) and pulleys (28a, 28b) is shown on the right. The top or bottom pulley could be connected to another generator to be used as a power take-off. The spring function may be provided by a rotary hydraulic pump/motor 48 and an accumulator 52 or by controller 50 driving generator/motor 40. It would also be possible to connect a torsional spring to one of the pulley shafts to act as a spring to keep the reaction mass centered. This configuration, compared to FIG. 7A has the advantage that the belts only flex in one direction (e.g. always clockwise around a pulley), which increases their longevity.

Power take-off is accomplished with one or more belt and pulley systems. In the illustration, pulleys 30a and 30b, belts 27a and 27b, generator 40, shaft 34, and controller 50 form one power take-off device. As in FIG. 7A, the generator is either driven to produce electric power (like a damper) or is controlled to keep the reaction mass centered (like a spring).

The containers (cans, hulls, shells) of the WEC buoy 10 shown in the figures may be symmetrical or asymmetrical structures. Symmetrical structures may be easier to design and construct. Asymmetrical structures, like a ship hull, may allow reduction in number of reaction masses and PTOs and or provide an increase in the length of the "stroke" of travel, and therefore may be a better approach in some cases. If an asymmetrical structure is used, the hull may include a system to keep it pointed into the direction of the predominant waves. Pointing may be provided by a mooring, wind vane device, or active thrust device (e.g. thruster or powered propeller).

The PDWEC device is primarily responsive to the varying amplitude of surface waves which cause the hull to respond in what may be termed as a see-saw like effect. For best "pitching" response, the length of the hull (or its width) should be approximately equal to ½ the wave length of the waves.

The height of the hull may vary over a wide range (e.g., from 1/10 times the diameter to 1.5 times the diameter/length of the hull. The height of the hull is a function of a variety of factors such as desired displacement (mass), freeboard (height above water), effective maximum stroke, stability and survivability.

FIGS. 8A, 8B, 9, 10, and 11 are highly simplified cross-sectional views illustrating that the shape of the hull 100 may be varied to provide longer strokes and/or more efficient response to the waves. These figures show that the container may have different shaped sections or chambers. For example, the hull 100 may include a number of interconnected cylinder-like structures (sections or chambers). The hull can be shaped to increase the length of the "stroke" and such that hydrodynamic performance of the hull is optimized, and/or buoy fabrication cost is minimized. The WEC buoy hull 100 does not have to be a single regularly shaped cylinder. Rather, the hull can be shaped such that the hydrodynamic performance of the hull is optimized and/or buoy fabrication cost is minimized.

The particular embodiments of FIGS. 8A and 8B show a PDWEC device with its reaction masses (M1A, M1B) in outer chambers (81, 83) and one (or more) heave responsive WEC devices 105 housed in the center chamber 85. The PDWEC device has its reaction masses (M1A, M1B) located in the outer chambers (81, 83), with the masses being coupled such that when one reaction mass (e.g., M1A) in one chamber (e.g., 81) moves up, the other reaction mass (e.g., M1B) in an opposing chamber (e.g., 83) goes down. In FIG. 8A the coupling belts would pass through separate pipes or conduits that are sealed from the outside environment.

The particular embodiment shown in FIG. 8B includes a PDWEC device with its reaction masses (M1A, M1B) in the outer "chambers" and a heave responsive WEC (shown with dotted line envelope) in the center chamber. In FIG. 8B, the coupling belts would pass through a common pipe or conduit that is sealed from the outside environment.

In FIG. 9, P&HWEC devices (600a, 600b) are shown mounted in the outer chambers with a heave responsive WEC in the center (dotted line) chamber.

FIGS. 10 and 11 show that the container 100 of the WEC buoy can have different shaped sections and does not have to be a single cylinder. It can be shaped such that the stroke length and the hydrodynamic performance is optimized and/or buoy fabrication cost is minimized. FIGS. 10 and 11 also show that the container can have pitch and/or P&HWEC devices positioned in the outer "sections" and a heave responsive WEC device in the center section. In FIG. 10 the bottom edge of the container is formed with angled sections extending from the bottom of the container. The distance between the top of the container and the apex of the descending angled members provides an increase in the up-down travel distance (stroke) of the reaction masses without inordinate increase in hull mass or cost. In addition, the shape of the angled members help reduce "slam" loads on the bottom of the container, and can have improved hydrodynamic performance for better energy capture capability.

FIG. 11 shows that the top of the container can be formed with angled sections extending from the top of the container to provide an increase in the up-down travel distance of the reaction masses without inordinate increase in hull mass or cost.

FIG. 12 is an idealized cross-sectional view of a rotating reaction mass WEC device embodying the invention. The WEC device includes a circular drum 140, of constant radius r1, rotatably mounted on a shaft 142 which is either attached to the side of a container 100 or is supported by means of one or more posts 144 resting on the bottom of the container 100. A reaction mass M1 is attached to one end of a rigid lever arm 146, of length r2, who's other end is attached to the outer surface of the drum 140. A spring 150 is shown attached at one end to a wall of the container 100 and at its other end to a point on the drum. A power take off device (PTO) is shown connected to lever arm 146. But, it could be connected to any suitable point of the WEC device structure. In response to downward pitching (rolling) or heaving of the container 100 the reaction mass rotates in an upward direction (see FIG. 12A). In response to upward pitching (rolling) or heaving of the container 100 the reaction mass rotates in a downward direction (see FIG. 12B). The movement of the reaction mass is then converted into useful energy (e.g., electric energy) by the PTO.

An advantage of the WEC device configuration of FIG. 12 is that a stiff, short spring can be used to: a) hold the reaction mass up and b) provide the desired resonant frequency of mass oscillation. As the reaction mass moves downward relative to the shell (or the shell moves upward), the spring stretches and applies more backforce to try to return the reaction mass to the center of stroke. An advantage of this approach is that the spring rate (i.e., the force per length extension) of the spring, as seen by the reaction mass, is reduced by $1/R^2$, where R is the ratio of the lever arm length (r2) to the radius (r1) of the drum (or pulley) at the pivot point. Another advantage is that the displacement (stroke) of the spring is 1/R the displacement of the reaction mass. The net result is that a shorter, stiffer spring can be used to obtain the desired resonant frequency of the mass and spring system. Another advantage of this approach is that the stroke of the reaction mass can be maximized, because the space above and below the reaction mass is not needed for the guide system or power take-off device.

Another aspect of the invention is that the spring can be attached to any point on the drum, as shown in FIG. 12C. This feature allows the spring to be connected to the buoy container above, below, to the right, to the left, or at any other angle. This feature can allow a more compact and/or more implementable spring configuration. Note the container in FIG. 12c may have a length L2 which is less than the length L1 of the container in FIG. 12.

FIG. 12D shows the relationship of torque acting on the lever arm to the rotation arm of the arm. The torque is nearly proportional to the rotation angle. The spring can be positioned and pre-tensioned so that the reaction mass is centered in its range of travel. Movement of the WEC buoy container will cause the mass to rotate about the pivot point. The spring will attempt to restore the mass to its center of travel position.

The rotating reaction mass WEC device of FIG. 12 E is intended to be like the one shown in FIG. 12, except that the spring 150 is replaced by a rotary hydraulic spring (like in FIGS. 7A, 7B) comprising a hydraulic pump/motor 748, an accumulator 752 and a reservoir to hold the fluid. The hydraulic pump is coupled via a shaft 737 to the drum or hub to which the lever arm carrying the reaction mass is connected.

FIG. 16 shows another WEC device whose spring function includes a rotary hydraulic spring and operates in accordance with the invention. As the reaction mass moves up and down it causes the ball screw to turn clockwise or counter clockwise. The shaft of the ball screw is connected to the shaft of the rotary hydraulic pump/motor which controls the flow of fluid between the fluid reservoir and the accumulator. For one condition (when the reaction mass is at or near the top), the amount of fluid in the accumulator is at a minimum and the pressure exerted by the gas is at a minimum. For the other condition (when the reaction mass is at or near the bottom), the amount of fluid in the accumulator is at a maximum and the pressure exerted by the gas is at a maximum.

FIG. 13 illustrates the use of a cam/drum of varying radius to control the rotation of a rotating reaction mass WEC device. In FIG. 13 the cylindrical or circular drum of FIG. 12 is replaced with a drum/cam whose shape is non-circular to provide a variable torque mechanism. The drum/cam is shaped such that the torque exerted on the reaction mass by the spring is varied or controlled to produce a desired effect. For example, assume, as shown in FIGS. 13, 13A and 13B that: $r1a < r1 < r1b$. In response to pitching, rolling or heaving motion, as the reaction mass rotates upward (see FIG. 13A) from the mid position (shown in FIG. 13). The decreased length of r1a, compared to r1, results in a decrease in the torque exercised by the spring 150. This enables the reaction mass to return to mid-position more easily due to gravitational forces acting on the reaction mass. Referring to FIG. 13C it is seen that, for this condition, the torque decreases at an accelerated rate relative to the angular displacement. The effect is that the upward motion of the reaction mass will be lessened. As the reaction mass rotates downward (as shown in FIG. 13B), the fact that the length r1b is greater than r1 cause the torque to increase. The increase in the torque exerted by the spring helps to return the reaction mass to the center position. Referring to FIG. 13C, it is shown that, for this condition, the torque increases at an accelerated rate relative to the angular displacement. The effect is that the downward motion of the reaction mass will be lessened. Such a torque profile can help drive the reaction mass away from the top and bottom of the WEC buoy container and minimize the chance and/or amplitude of reaction mass impacts on end stops. If an extremely stiff spring is used, it might be necessary to increase the moment arm of the spring as the reaction mass moves upward. If the spring is extremely stiff, the spring force will decrease quickly as the reaction mass is rotated upward. In some cases, therefore, it may be necessary to use a drum, or "cam," with a shape that increases the effective pull of the spring as the reaction mass rotates upward.

FIG. 13C shows the relationship of torque acting on the lever arm to the rotation arm of the arm. At low rotation angles (the reaction mass is a the top), the torque applied to the reaction mass by the spring and lever arm system is quickly reduced, tending to keep the reaction mass from hitting the top of the buoy container. At high rotation angles (the reaction mass at the bottom), the torque applied to the reaction mass by the spring and lever arm system is quickly increased, tending to keep the reaction mass from hitting the bottom of the buoy container. Thus, using a non-circular drum, the torque exerted on the reaction mass by the spring can be "contoured," as shown in FIG. 13C. As the mass rotates upward or downward, the torque decreases or increases at an accelerated rate. Such a torque profile can help drive the reaction mass away from the top and bottom of the shell and minimize the chance and/or amplitude of reaction mass impacts on end stops.

The rotating reaction mass WEC devices of FIGS. 12 and 13 may be used to make WEC buoys of the type shown in FIGS. 14 and 15.

FIGS. 14A and 14B are, respectively, a simplified top view and a simplified cross-sectional view of rotating reaction mass WEC devices which may, for example, be of the type shown in FIGS. 12 and 13. In FIGS. 14A and 14B the reaction masses are located (and rotate) along the outer periphery and their lever arms are connected to a pivot point which is further inside the container 100. The reaction masses rotate on pivots. The pivot point is towards the center of the container and the rotation beams and reaction masses face outward.

FIGS. 15A and 15B are, respectively, a simplified top view and a simplified cross-sectional diagram of rotating reaction mass WEC devices which may, for example, be of the type shown in FIGS. 12 and 13. In FIGS. 15A and 15B the reaction masses are located away from the end of the container to take advantage of the greater height available away from the end of the container while their lever arms are connected to a pivot point which is along the outer periphery of the container 100 (see FIG. 15B). Each WEC device, in these figures, is responsive to heave, pitch and roll motions/forces. In this three-WEC embodiment, the reaction masses rotate on pivots. The pivot points are near the outer rim (edge) of the buoy and rotation beams and reaction masses face inward. An advantage of this approach is that the height of the outer edge of the buoy can be reduced (shaped) for possible hydrodynamic benefit (e.g. reduce slam load or drag that would occur with a hull that is tall at the outer circumference.

In FIGS. 14A and 15A it is shown that three WEC devices are included in the WEC buoy. Each WEC, in these figures, is responsive to heave, pitch and roll motions/forces. If only one WEC device is used, it likely has to be placed in the center, and will not respond well to pitch and roll forces/motions. If two WEC devices are used, then energy can be captured from heave and pitch or heave and roll. Also, if two WEC devices are used, the buoy will yaw to the lowest energy state for wave energy capture. The use of three or more WEC devices precludes loss of power situation due to this "yawing" condition.

It should be evident from the discussion above that the embodiments shown are for purpose of illustration and that many different types of WEC devices may be used to practice the invention.

What is claimed is:

1. A multi-mode wave energy converter (WEC) buoy comprising:
   a container designed to extend along a surface of a body of water and to be responsive to heave motion and to pitch motion of the waves in the body of water;
   a heave responsive wave energy converter (WEC) device mounted within, and generally about, the center portion of the container to respond primarily to heave motion of the container;
   N pitch responsive wave energy converter (WEC) devices mounted within the container and generally about the outer periphery of the container designed to respond to pitch motion of the container; where N is equal to or greater than 1; and
   a power take-off (PTO) device coupled to each one of said heave responsive (WEC) device and said pitch responsive (WEC) devices to produce useful energy.

2. A multi-mode WEC buoy as claimed in claim 1 wherein at least one of said N WEC devices includes a first reaction mass positioned near one end of the container and a second reaction mass positioned near the opposite end of the container, and means coupled to and interconnecting said reaction masses such that they move generally up and down and such that when one mass moves up the other mass moves down and when the one mass moves down the other mass moves up.

3. A multi-mode WEC buoy as claimed in claim 2, wherein the means coupled to and interconnecting the first and second reaction masses includes cabling means and rollers with the cabling means connected between the reaction masses being wound around the rollers for causing the reaction masses to move generally up and down in a push-pull arrangement.

4. A multi-mode WEC buoy as claimed in claim 2, wherein the means coupled to said first and second reaction masses and interconnecting them includes a rigid lever mounted within the container and extending along the length of the container, with the rigid lever being pivoted at its center with one reaction mass connected to one end of the lever and the other reaction mass connected to the other end of the lever.

5. A multi-mode WEC buoy as claimed in claim 2, wherein the means coupled to said first and second reaction masses and interconnecting them includes a first rotatable member attached to the first reaction mass via a first lever arm and a second rotatable member attached to the second reaction mass via a second lever arm and linking means connected between the first and second rotatable members for causing them to move in tandem.

6. A multi-mode WEC buoy as claimed in claim 1, wherein at least one of said N WEC devices includes a pitch and heave WEC device designed to respond to pitching motion of the container.

7. A multi-mode WEC buoy as claimed in claim 1 wherein at least one of said N WEC devices includes a reaction mass having a top side and a bottom side and arranged to move generally up and down between top and bottom rollers with coupling means coupled between the top side via said top roller to said bottom side via said bottom roller; and wherein said coupling means includes means for driving a generator to produce electrical energy.

8. A multi-mode WEC buoy as claimed in claim 1 wherein at least one of said pitch responsive wave energy converter (WEC) includes a reaction mass attached via a lever arm to a drum of constant radius, the drum being rotatably mounted within the container and including a spring connected between the drum and the container.

9. A multi-mode WEC buoy as claimed in claim 1 wherein at least one of said pitch responsive wave energy converter (WEC) includes a reaction mass attached via a lever arm to a cam/drum of variable radius, the cam/drum being rotatably mounted within the container and including a spring connected between the cam/drum and the container.

10. A multi-mode WEC buoy as claimed in claim 1 wherein said heave responsive device includes a reaction mass having a top side and a bottom side and arranged to move generally up and down between top and bottom rollers with coupling means coupled between the top side via said top roller to said bottom side via said bottom roller; and wherein said coupling means includes means for driving a generator to produce electrical energy.

11. A multi-mode WEC buoy as claimed in claim 1 wherein one of the underside and topside of the container includes V-shaped extensions for providing an increased distance between the top of the container and the apex of the V-shaped extension to provide a greater travel distance for the redaction mass.

12. A multi-mode WEC buoy as claimed in claim 1, wherein the container has a length (L) disposed to face incoming waves, a width (W), and a height (H); and wherein L is equal to, or greater than, W.

13. A wave energy converter (WEC) buoy comprising:
a container designed to extend along the surface of a body of water and to be responsive to motion of waves in the body of water; said container having a top and a bottom;
a top pulley positioned about the top of the container and a bottom pulley positioned about the bottom of the container;
a reaction mass having a top attachment point and a bottom attachment point,
means coupled between the top and bottom attachment point of the reaction mass to cause the reaction mass to travel between the top and bottom pulleys in response to wave motion, said means also including means for driving an electric generator to produce electrical energy and also including means tending to control the position of the reaction mass so it is positioned generally midway between the top and bottom pulleys.

14. A wave energy converter as claimed in claim 13, wherein said means for driving an electric generator to produce electrical energy and also including means tending to control the position of the reaction mass so it is positioned generally midway between the top and bottom pulleys including control means coupled to said generator for enabling said generator to function as a motor and cause said reaction mass to tend to go halfway between said top and bottom rollers.

15. A wave energy converter as claimed in claim 13, wherein said means tending to control the position of the reaction mass so it is positioned generally midway between the top and bottom pulleys includes a hydraulic pump/motor coupled to an accumulator for providing a spring function to cause said reaction mass to tend to go halfway between said top and bottom rollers.

16. A wave energy converter (WEC) buoy comprising:
a container designed to extend along the surface of a body of water and to be responsive to motion of waves in the body of water; said container having a top and a bottom;
a top pulley positioned about the top of the container and a bottom pulley positioned about the bottom of the container;
a reaction mass having a top side and a bottom side,
connecting means coupled from the top side of the reaction mass around the top pulley and around the bottom pulley to the bottom side of the reaction mass to cause the reaction mass to travel between the top and bottom pulleys in response to wave motion,
an electric generator;
means responsive to the movement of said connecting means coupled to the electric generator for driving the electric generator and producing electrical energy; and
control means coupled to one of said electric generator, pulleys and connecting means tending to control the position of the reaction mass so it is positioned generally midway between the top and bottom pulleys.

17. A (WEC) buoy as claimed in claim 16 wherein said control means is responsive to the position and velocity of the reaction mass.

18. A wave energy converter (WEC) buoy as claimed in claim 16 wherein said reaction mass is responsive to pitch motion or heave motion of the container.

19. A wave energy converter (WEC) buoy comprising:
a container designed to extend along the surface of a body of water and to move in response to motion of waves in the body of water; said container having a top and a bottom region;
a drum rotatably mounted about its center between the top and bottom region of the container;
a reaction mass attached via a lever arm, of predetermined length to the outer periphery of the drum; said reaction mass moving up and down in response movement of the container;
a spring attached at one end to the outer periphery of the drum and at its other end to a selected point of the container for providing a counter force to the movement of the reaction mass; and
a power take off device (PTO) responsive to movement of the reaction mass to produce useful energy.

20. A WEC buoy as claimed in claim 19, wherein said drum is of a constant radius.

21. A WEC buoy as claimed in claim 19, wherein said drum is a cam of variable radius, where the radius is varied to increase the torque imparted by the spring when the reaction mass rises towards the top region and to decrease the torque imparted by the spring when the reaction mass moves towards the bottom region of the container.

22. A WEC buoy as claimed in claim 19, wherein said drum is located about the center of the container and wherein said reaction mass is located along the outer the outer periphery of the container.

23. A WEC buoy as claimed in claim 19, further including two other drums located about the center of the container and two other reaction masses located along the outer the outer periphery of the container with associated springs and power take off devices.

24. A wave energy converter (WEC) buoy comprising:
a container designed to extend along the surface of a body of water and to be responsive to motion of waves in the body of water; said container having a top and a bottom;
a drum of diameter rotatably mounted about its center between the top and bottom of the container;
a reaction mass attached via a lever arm of fixed length to the outer periphery of the drum;
a spring attached at one end to the outer periphery of the drum and at its other end to a selected point of the container; and
a power take off device (PTO) responsive to movement of the reaction mass to produce useful energy.

25. A wave energy converter (WEC) buoy comprising:
a container designed to extend along the surface of a body of water and to be responsive to motion of waves in the body of water; said container having a top and a bottom;

a drum/cam having a central pivot point and a variable radius for causing the outer envelope of the drum/cam to have a variable distance from the central pivot, said drum/cam mounted about its center pivot point between the top and bottom of the container;

a reaction mass rigidly attached via a lever arm of fixed length to the outer periphery of the drum/cam to enable the reaction mass to rotate up and down about the central pivot;

a spring attached at one end to the outer periphery of the drum and at its other end to a selected point of the container; and a power take off device (PTO) responsive to movement of the reaction mass to produce useful energy.

26. A WEC buoy as claimed in claim 25 wherein the drum/cam is shaped such that the cam decreases the torque exerted by the spring when the reaction mass rotates above the center point and increases the torque exerted by the spring when the reaction mass rotates below the center point.

* * * * *